(12) United States Patent
Thompson et al.

(10) Patent No.: US 12,381,755 B2
(45) Date of Patent: Aug. 5, 2025

(54) SYSTEMS AND METHODS FOR ADJUSTING A MEDIA CONSUMPTION ENVIRONMENT BASED ON CHANGES IN STATUS OF AN OBJECT

(71) Applicant: Adeia Guides Inc., San Jose, CA (US)

(72) Inventors: Mark D. Thompson, Wayne, PA (US); Daniel P. Rowan, Wayne, PA (US); Jennifer L. Holloway, Wallingford, PA (US); Sara Dever, Boothwyn, PA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/612,851

(22) Filed: Mar. 21, 2024

(65) Prior Publication Data

US 2024/0388465 A1 Nov. 21, 2024

Related U.S. Application Data

(63) Continuation of application No. 17/040,251, filed as application No. PCT/US2018/024746 on Mar. 28, 2018, now abandoned.

(51) Int. Cl.
*H04L 12/28* (2006.01)
*G16Y 40/30* (2020.01)
*H04N 21/436* (2011.01)

(52) U.S. Cl.
CPC .......... *H04L 12/2827* (2013.01); *G16Y 40/30* (2020.01); *H04L 12/2821* (2013.01); *H04N 21/43615* (2013.01)

(58) Field of Classification Search
CPC . H04L 12/2827; H04L 12/2821; G16Y 40/30; H04N 21/43615
See application file for complete search history.

(56) References Cited

U.S. PATENT DOCUMENTS

| | | | |
|---|---|---|---|
| 6,239,794 B1 | 5/2001 | Yuen et al. | |
| 6,388,714 B1 | 5/2002 | Schein et al. | |
| 6,564,378 B1 | 5/2003 | Satterfield et al. | |
| 6,756,997 B1 | 6/2004 | Ward et al. | |
| 6,909,921 B1 | 6/2005 | Bilger | |
| 7,003,161 B2 | 2/2006 | Tessadro | |
| 7,165,098 B1 | 1/2007 | Boyer et al. | |
| 7,761,892 B2 | 7/2010 | Ellis et al. | |
| 8,782,121 B1 * | 7/2014 | Chang ............... | H04L 67/104 709/219 |
| 9,288,387 B1 | 3/2016 | Keller | |
| 2002/0174430 A1 | 11/2002 | Ellis et al. | |
| 2003/0052911 A1 | 3/2003 | Cohen-Solal | |
| 2003/0110499 A1 | 6/2003 | Knudson et al. | |

(Continued)

*Primary Examiner* — Brian J. Gillis
*Assistant Examiner* — Juan C Turriate Gastulo
(74) *Attorney, Agent, or Firm* — Haley Guiliano LLP

(57) ABSTRACT

Systems and methods are described adjusting a media asset consumption environment based on detected changes in status of an object. For example, a media guidance application may detect a change in setting of a device in a first room and, in response to detecting the change in the setting, may determine the state of an object in the room. Based on the detected change in the setting and of the state of the object, the media guidance application may identify a setting for a media consumption device and may modify setting of the media consumption device so that it is consistent with the conditions defined by the change in the setting and the state of the object.

20 Claims, 10 Drawing Sheets

(56) References Cited

U.S. PATENT DOCUMENTS

| | | |
|---|---|---|
| 2005/0251827 A1 | 11/2005 | Ellis et al. |
| 2006/0218575 A1 | 9/2006 | Blair |
| 2010/0153885 A1 | 6/2010 | Yates |
| 2012/0011233 A1 | 1/2012 | Dixon et al. |
| 2013/0021535 A1* | 1/2013 | Kim .................. H04N 21/4122 |
| | | 348/E5.122 |
| 2014/0250447 A1 | 9/2014 | Schink |
| 2014/0334644 A1 | 11/2014 | Selig et al. |
| 2015/0189378 A1* | 7/2015 | Soundararajan ............................ |
| | | H04N 21/44222 |
| | | 725/12 |
| 2015/0309484 A1 | 10/2015 | Lyman |
| 2016/0080165 A1 | 3/2016 | Ehsani et al. |
| 2016/0241907 A1 | 8/2016 | Pearson |
| 2016/0261425 A1* | 9/2016 | Horton ................ H04L 12/2803 |
| 2016/0335865 A1 | 11/2016 | Sayavong et al. |
| 2017/0055126 A1* | 2/2017 | O'Keeffe ................ H04W 4/21 |
| 2017/0191695 A1 | 7/2017 | Bruhn et al. |
| 2018/0066863 A1 | 3/2018 | Hatch et al. |
| 2018/0129514 A1* | 5/2018 | Lefevre .................. H04H 60/32 |
| 2018/0259922 A1 | 9/2018 | Nill et al. |
| 2019/0173446 A1* | 6/2019 | Knode ..................... H03G 3/32 |
| 2020/0322252 A1 | 10/2020 | Fargier |
| 2020/0359154 A1* | 11/2020 | Brown ................ H04R 29/001 |
| 2021/0014078 A1 | 1/2021 | Thompson et al. |
| 2021/0105519 A1* | 4/2021 | Beckhardt ............... G06F 3/165 |
| 2022/0078191 A1 | 3/2022 | Panje et al. |

* cited by examiner

600

602
Retrieve a first plurality of device settings corresponding to a plurality of network-connected devices, where each of the plurality of network-connected devices is associated with a first room in a household

604
Detect one or more changes of status in the first plurality of device settings

606
Detect a state of an object in the first room in the household

608
Determine an environmental condition of the first room based on the one or more changes of status in the first plurality of device settings and the state of the object in the first room in the household

610
Identifying a media consumption device in a second room in the household

612
Determine whether settings of the media consumption device in the second room are consistent with the environmental condition for the first room

614
Automatically adjust the settings of the media consumption device in a manner consistent with the environmental condition

FIG. 6

SYSTEMS AND METHODS FOR ADJUSTING A MEDIA CONSUMPTION ENVIRONMENT BASED ON CHANGES IN STATUS OF AN OBJECT

CROSS-REFERENCE TO RELATED APPLICATIONS

This application is a continuation of U.S. patent application Ser. No. 17/040,251, filed Sep. 22, 2020, which is a national stage application under 35 U.S.C. § 371 of International Application PCT/US2018/024746, filed Mar. 28, 2018, which are hereby incorporated by reference their entireties.

BACKGROUND

Historically, users were required to manually change and adjust settings in a media consumption environment (e.g., settings on a user's television, to adapt to changes in the user's environment. For example, a user may need to manually lower the volume on a television when the user receives a telephone call so that the user can carry on a telephone conversation without being distracted by the television. Some conventional systems solved that issue by embedding sensors within media consumption devices that enabled adjustment of certain settings on media consumption devices. For example, conventional systems may automatically adjust the brightness on an electronic tablet based on a detected level of ambient light. However, these systems are generally limited to changing settings based on detecting changes at the devices sensor inputs or based on what a specific media consumption device is playing.

SUMMARY

Accordingly, systems and methods are described herein for a media guidance application that adjusts a media asset consumption environment based on detected changes in status of an object. For example, a media guidance application may communicate with multiple internet-of-things (IOT) devices and may detect changes in a user's environment based on sensors associated with the IOT devices. For example, the media guidance application may detect when an internet-connected light in a user's garage switches from on to off. In response to detecting a change in a status of a sensor at an IOT device, the media guidance application may determine a status of an object in the environment of the user. For example, in response to determining that the light in the user's garage switches from on to off, the media guidance application may determine the status of an object, such as a car, in the garage of the user. The media guidance application may determine the status of the object in response to detecting the state of the light switch, because the media guidance application may make a more accurate determination as to the environment of the user based on the status of the object and the status of the sensor instead of the status of the sensor alone. The media guidance application may control a media consumption device based on the determined environment of the first room (e.g., the detected sensor state and the state of the object).

The media guidance application may determine the status of the object based on sensors associated with the object or based on sensors associated with other IOT devices. For example, the media guidance application may determine a status of the car, such as whether it is present in the garage or not, based on a camera within the garage or a sensor embedded within the car that communicates with the media guidance application. The media guidance application may determine, based on the status of the object, settings for a media consumption device in a user's media consumption environment. For example, the media guidance application may determine that a user's television should be turned on when the media guidance application detects that the light changes from on to off and that the car is in the garage (e.g., because the user may be arriving home and may wish to view television).

In contrast, the media guidance application may determine that the user's television should be turned off when the light changes from on to off and the car is not in the garage (e.g., because the user may be leaving their home and may wish to save energy by keeping the television off while away). The media guidance application may query the media consumption device for its current settings and may adjust the settings of the media consumption device in a manner that is consistent with a condition of the user's household. For example, the media guidance application may determine whether the television is presently turned on or turned off. If the media guidance application determines that the user has just left his/her home (e.g., the condition), the media guidance application may adjust a setting of the television to ensure that it is turned off. If the media guidance application determines that the user has arrived home (e.g., the condition), the media guidance application may adjust a setting of the television to ensure that it is turned on. By detecting a change in a state of a sensor and determining a status of an object to identify an environmental condition, the media guidance application is able to more accurately determine environmental conditions of a user's household and can offer greater control over settings for a user's media consumption devices.

In some aspects, the media guidance application may receive, over a network associated with a household, at a first time, a first plurality of device sensor states corresponding to a plurality of network-connected devices located in a first room of a household. For example, the media guidance application may be located on a network of a user's household and may communicate with a plurality of devices, such as IOT devices over the network connection of the household (e.g., a Wi-Fi connection). The network-connected devices may have embedded sensors that can measure and detect changes in the environment and convert those measurements to an electronic signal. The media guidance application may query the network-connected devices for a value of a signal output from the corresponding network-connected device. In response to transmitting the query, the media guidance application may receive, over the network, settings from the network-connected devices. For example, the media guidance application may communicate with a network-connected light switch (e.g., IOT device) and may determine, based on a status of a sensor associated with the light switch, whether a light connected to the light switch is turned on or off.

In some embodiments, the media guidance application may retrieve from the network-connected devices a plurality of device settings. For example, the media guidance application may communicate, over the network connection, with a network-connected light switch to request a setting of a relay in the light switch that controls the flow of current to a lamp connected to the light switch. The media guidance application may determine whether the light is turned on or off based on the setting (e.g., based on a binary value indicating whether the relay is in an on or off position).

The media guidance application may detect, at a second time, a change in a sensor state for a sensor associated with the network-connected devices. For example, the media guidance application may communicate with a network-connected power outlet including a current monitor. The media guidance application may query the network-connected power outlet to determine whether a device connected to the outlet is turned on or off (e.g., based on an amount of current measured by the current monitor of the network-connected power outlet). In another example, the network-connected device may receive a network communication indicating a change in the state of the sensor. For example, the media guidance application may configure the network-connected device to transmit a communication when there is a status update relating to the sensor of the network-connected device. For example, the media guidance application may configure a network-connected light switch to send a first packet to the media guidance application whenever a light switch goes from on to off and a second packet when the light switch is switched from off to on. The media guidance application may detect the changes in status in response to receiving the packet.

In some embodiments, the media guidance application may monitor the network associated with the household for packets indicating sensor states for sensors corresponding to the plurality of network-connected devices. For example, the media guidance application may monitor a network connection, such as an ethernet connection, for incoming packets from the network-connected devices. The media guidance application may detect one or more packets from the network-connected device indicating the sensor state for the sensor associated with the network-connected device. For example, the media guidance application may identify an originator of the packet based on header information associated with the packet and may analyze the packet to determine whether a payload of the packet includes data indicating a state of a sensor (e.g., based on a header of the packet).

In some embodiments, the media guidance application may receive, over the network associated with the household, at a first time, the first plurality of sensor states corresponding to the plurality of network-connected devices by querying each of the first plurality of network-connected devices. For example, the media guidance application may retrieve a plurality of network addresses, each corresponding to a respective network-connected device of the plurality of network-connected devices. For example, the media guidance application may store a network address table indicating a network address for each network-connected device (e.g., a smart thermostat). The media guidance application may generate one or more network packets querying the network-connected device (e.g., a packet indicating a destination of the smart thermostat) for a sensor setting (e.g., for the temperature). In response to transmitting the query, the media guidance application may receive a response from each of the plurality of network-connected devices that includes one or more sensor states associated with the respective network-connected device. For example, the media guidance application may transmit a query to each of the plurality of network-connected devices (e.g., a network-connected thermostat, light switch, television, etc.) and may receive an indication from each of those devices of a setting or sensor state corresponding to the device. For example, the media guidance application may transmit a query to the television or a set-top box to determine what media is being played back at the television and may, in response to transmitting the query, receive an indication of a program displayed on the television (e.g., the state of the media displayed on the television).

In some embodiments, the media guidance application may store the current state or setting of the network-connected device in a database to detect whether there are changes in the state or setting of the network-connected device. For example, the media guidance application may store, in a database, the sensor or state value received at the first time. At a second time, the media guidance application may reference the state or setting stored in the database to determine whether the state or setting has changed between the first time and the second time.

In some embodiments, the media guidance application may receive, at the second time from the network-connected device, one or more packets indicating the sensor state of the sensor associated with the network-connected device. For example, the media guidance application may detect a network packet, as described above, and may analyze data in the payload to determine whether the packet comprises information about a sensor state. In response to detecting that the packet comprises information about a sensor state, the media guidance application may store the sensor state in memory and may compare the sensor state received in the packet with a previous value for the sensor state. For example, the media guidance application may receive a packet from a network-connected light switch indicating that the light switch is turned on. The media guidance application may compare the sensor state received in the packet with a previous sensor state (e.g., a sensor state received by the media guidance application at a time prior to the second time, stored in memory). The media guidance application may compare the sensor state with the previous sensor state to determine whether the sensor state changed. For example, the media guidance application may compare the state of the light switch (e.g., light on) with a previous sensor state stored in memory (e.g., light off). The media guidance application may determine, based on comparing the sensor state with the previous sensor state whether there is a change in the state of the sensor. When the media guidance application determines that the value of the current state differs from the value of the previous state, the media guidance application may determine that there has been a change in sensor state. When the media guidance application determines that there is no difference between the current sensor state and the previous sensor state the media guidance application may determine that there has been no change in state for the sensor.

In response to detecting the change in the sensor state, the media guidance application may detect the state of an object located in the first room. For example, the media guidance application may determine whether a car is in a garage of the user when the media guidance application determines that the light in the garage turns from on to off (e.g., to determine whether the user has left the house or has arrived home). For example, the media guidance application may communicate with the object over a network connection (e.g., a network-connected computer associated with the car) to determine a state for the car. For example, the media guidance application may determine, based on communicating with the computer of the car, whether the car has just turned from on to off, or off to on, etc. For example, the media guidance application may determine that the user is getting ready to leave their household when the car is in the garage running but may determine that the user is arriving to the household when the car is off.

In some embodiments, the media guidance application may determine the state of the object in the first room based on searching a database of sensors and identifying a sensor capable of monitoring a state of the object. For example, the media guidance application may search a database listing monitoring capabilities associated with each sensor of the plurality of sensors located in the first room for a sensor, of the plurality of sensors, capable of monitoring a state of the object located in the first room. For example, the media guidance application may determine the state of a vehicle in the room by searching the database of sensors for a sensor that is associated with monitoring the vehicle. For example, the media guidance application may determine that a camera associated with the garage is capable of monitoring a presence of the vehicle and that an ignition switch sensor is capable of monitoring whether the car is running or not. The media guidance application may receive an output from the sensor capable of monitoring the state of the object located in the first room. For example, the media guidance application may communicate with the ignition switch sensor of the vehicle (e.g., via a network-connected computer associated with the vehicle) and may determine whether the car is running (e.g., the state of the car) based on a state of the ignition switch sensor. The media guidance application may compare the output of the sensor to a mapping between sensor outputs and states of the first object to determine the state of the object. For example, the media guidance application may compare a value output from the sensor to a lookup table to determine a state of the car for the output value.

The media guidance application may determine an environmental condition for the room based on comparing the state of the object with the sensor states of the plurality of network-connected devices. The media guidance application may compare the state of the object in the first room and the sensor state with object states and sensor states stored in a database, where the database stores one or more sensor states and one or more object states. For example, the media guidance application may determine that a light switched from on to off and that a car in the garage is not running. The media guidance application may compare the sensor state (e.g., light off) and the object state (e.g., car running) to determine that the environmental condition is that the user has arrived home (e.g., because when a light in the garage has just been turned off and the vehicle is off, that the user is arriving home).

The media guidance application may determine an environmental condition for the first room, where the environmental condition for the first room corresponds to both the state of the object in the first room and the sensor state. For example, the media guidance application may identify a sensor state of the light switch (e.g., light off) and a state of the vehicle (e.g., car off) and may determine based on the combination of the light switch changing from on to off and the car being turned off, that the user has arrived home.

In response to determining the environmental condition for the first room, the media guidance application may retrieve a template associated with the environmental condition including a setting for a media consumption device that is consistent with the environmental condition. For example, the media guidance application may turn on a user's television when the user arrives home so that a user can begin watching television without the user needing to manually instruct the television to turn on. For example, the media guidance application may retrieve, from a database, a template listing a plurality of commands for the media guidance application to transmit to a media consumption device in response to identifying the environmental condition (e.g., a command to turn on a television and turn the screen to full brightness).

In some embodiments, the media guidance application may compare each respective setting of the first plurality of settings with a corresponding setting of a second plurality of settings associated with the media consumption device. For example, the media guidance application may determine that the template identifies a plurality of settings for the media guidance application such as a setting to turn on a television and tune the television to a specific channel. The media guidance application may determine, based on the template, whether the second plurality of settings associated with the media consumption device matches a corresponding setting of the second plurality of settings. For example, the media guidance application may determine whether the television is already turned on or off and may turn on the television when the media guidance application determines that the television is turned off (e.g., to make the setting for the television consistent with the setting in the template). The media guidance application may iterate through each of the settings associated with the template and may compare those settings to corresponding settings associated with the television to determine whether the settings in the television are consistent with settings in the template. When the media guidance application determines that a setting is not consistent, the media guidance application may modify a setting of the television to make the setting of the television consistent with the setting in the template.

In some embodiments, the media guidance application may identify the template based on the setting or states of sensors of multiple network-connected devices. For example, the media guidance application may retrieve a template associated with the environmental condition (e.g., light turned off in the garage and the car is not running). The media guidance application may retrieve a second sensor state of a plurality of sensor states in the template, where the second sensor state is associated with a second network-connected device of the plurality of network-connected devices. For example, the media guidance application may determine that the template identifies a second sensor setting, such as an ambient light setting, and may determine whether the template is appropriate based on the second sensor's setting. For example, the media guidance application may determine that the template identifies a television turned on and a level of brightness for a screen of the television, when the media guidance application detects the environmental setting in the second room. The media guidance application may further determine that the template applies or varies based on the ambient light in the room (e.g., when the ambient light is below a certain threshold, the screen brightness is set to a lower level than when the ambient brightness is set to a higher level). For example, when the media guidance application determines that the ambient light is above a certain threshold, the media guidance application may retrieve a different template (e.g., a template associated with the environmental condition for ambient light above a certain threshold that does not require turning on a light in the living room).

For example, the media guidance application may query the second network-connected device for a current state of a second sensor. For example, the media guidance application may transmit a query to the ambient light sensor to determine an ambient light level. The media guidance application may compare the current state of the sensor to the second sensor state in the template. For example, the media guidance application may determine that the second sensor state in the template defines a range of 0-5 out of 10. The media guidance application may determine that when the current state of the sensor (e.g., value from the ambient light sensor) is within the range, that the template matches the environmental condition, and that when the value from the sensor is outside of the range, the template does not match the environmental condition.

In response to determining that the setting in the template is consistent with the setting associated with the media consumption device, the media guidance application may automatically adjust the setting of the media consumption device in a manner consistent with the environmental condition. For example, the media guidance application may adjust the settings of the media consumption device so that they are consistent with the setting or settings identified in the template. The media guidance application may compare settings in the template with corresponding settings associated with the media consumption device. For example, the media guidance application may receive a setting from the template indicating that the television should be turned on in response to detecting that the light has turned from on to off in the garage and the car in the garage is not running (e.g., the environmental condition).

In some embodiments, the media guidance application may retrieve a value associated with the setting in the template and may compare the value in the template to a value associated with a state of the sensor and may adjust a setting in the media consumption device to make the setting of the media consumption device consistent with that in the template. For example, the media guidance application may determine that the template identifies a value of 5 or higher for a brightness of the television and that the current brightness of the television is 4. The media guidance application may identify, based on the attribute of the media consumption device, an Application Programming Interface ("API") compatible with communicating commands to the media consumption device. For example, the media guidance application may identify an operating system ("OS") running on the television and may generate a command to increase the brightness of the television that is compatible with the OS running on the television. The media guidance application may generate one or more packets, based on the API, including a command to adjust a value of the setting of the media consumption device to the value associated with the setting in the template. For example, the media guidance application may identify a function in the API of the OS that adjusts the brightness of the television and may generate a packet that calls the function and including a desired brightness value (e.g., 6, which is greater than the minimum brightness value identified in the template). The media guidance application may transmit the packet to the media consumption device over the network connection.

The media guidance application may, in response to determining that the setting in the template is consistent with the setting associated with the media consumption device, maintain the setting of the media consumption device. For example, the media guidance application may keep the television turned on in response to determining that the television is already turned on.

In some embodiments, the media guidance application may determine that the media consumption device is outputting audio and video of a media asset at a media consumption device. For example, the media guidance application may query the media consumption device to determine whether the media consumption device is on, and if it is on, whether it is outputting audio and/or video. The media guidance application may determine, based on the template, that an audio output setting of the media consumption device is incompatible with an audio output setting in the template. For example, the media guidance application may determine that the template defines an audio output setting such as a setting for all audio to be output via headphones instead of via the media consumption device. In response to determining that the audio output setting of the media consumption device is incompatible with the audio output setting in the template, the media guidance application may adjust a setting of the media consumption device to be consistent with the audio output setting. For example, the media guidance application may determine that the television is outputting audio of the media asset via speakers of the media consumption device. The media guidance application may identify a second device, such as a pair of Bluetooth audio headphones, that is consistent with the audio output setting and may redirect the audio of the media asset to the Bluetooth headphones to make the setting of the media consumption device consistent with that of the template.

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6 depicts an illustrative process for adjusting a media consumption environment based on detecting a change in status of an object, in accordance with some embodiments of the disclosure;

DETAILED DESCRIPTION

Figure 1:
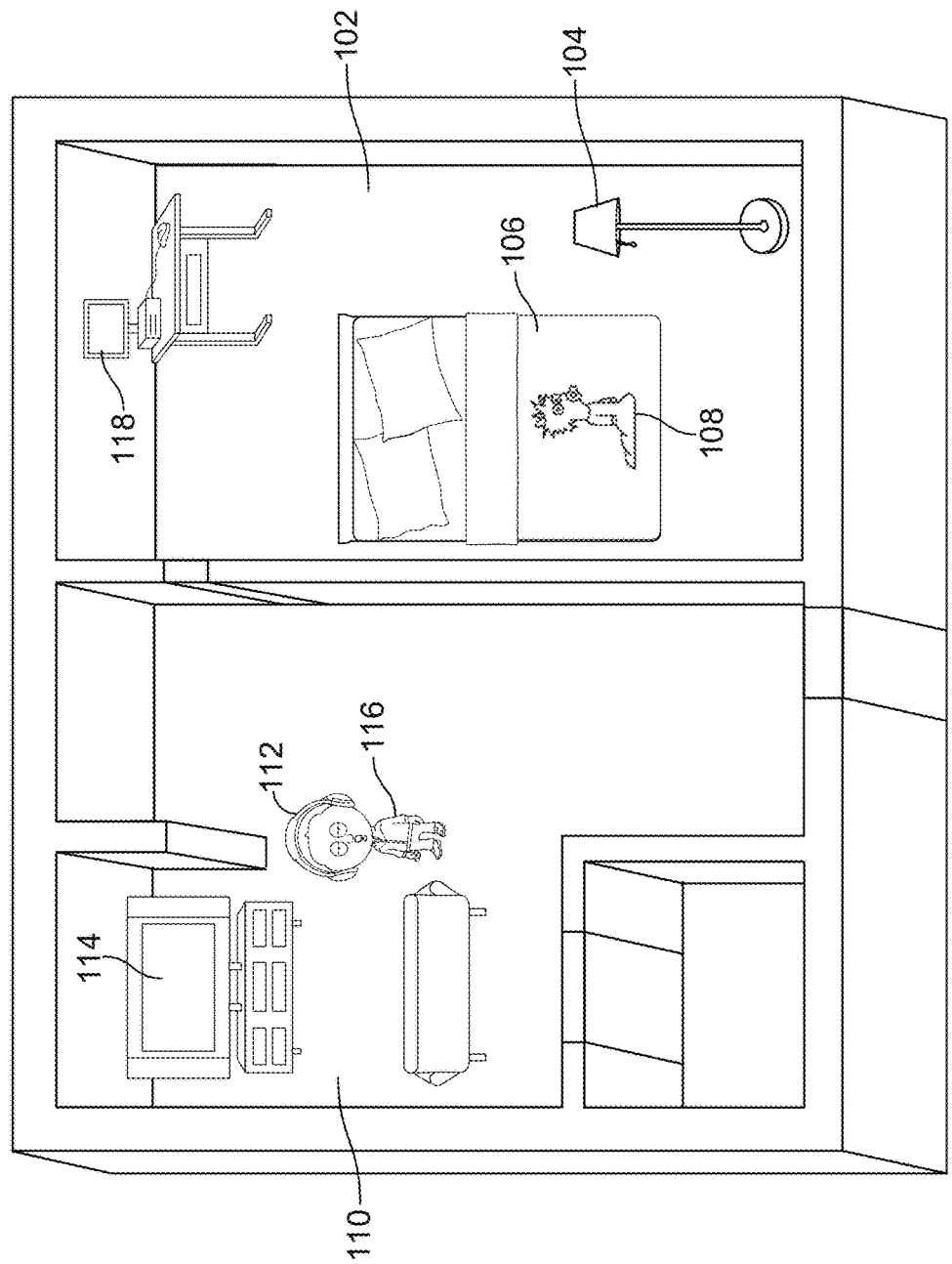
FIG. 1 shows an illustrative embodiment of a household including multiple network-connected devices, in accordance with some embodiments of the disclosure.

Systems and methods are described herein for a media guidance application that adjusts a media asset consumption environment based on detected changes in status of an object. For example, a media guidance application may communicate with multiple internet-of-things (IOT) devices and may detect changes in a user's environment based on sensors associated with the IOT devices. For example, the media guidance application may detect changes in the status of a sensor in a network-connected light switch in a user's garage. For example, the media guidance application may determine, based on a received status of the sensor, when the light switches from on to off. (e.g., based on data stored in a status register of the network-connected light switch transmitted from the light switch to the media guidance application).

In response to detecting a change in a status of a sensor at an IOT device, the media guidance application may determine a status of an object in the environment of the user. For example, in response to determining that the light in the user's garage switches from on to off, the media guidance application may determine the status of an object, such as a car, in the garage of the user. For example, the media guidance application may determine the status of the object in addition to detecting the state of the light switch so that the media guidance application may make a more accurate determination as to the environment of the user and may therefore more accurately control a media consumption device of the user. For example, the media guidance application may more accurately determine whether a user is entering or leaving his or her house based on both sensor states, such as states indicating that a light in the garage has turned off and that the garage door has closed and from a state of an object in the garage, such as the user's vehicle. Because, for example, the light in the garage may be turned off and the garage door may transition from open to closed when the user is either leaving or arriving home. However, by determining a status of the object (e.g., whether the car is in the garage) the media guidance application may more accurately determine whether the user is returning home, or whether the user is leaving the household.

The media guidance application may retrieve a first plurality of device settings corresponding to a plurality of network-connected devices, where each of the plurality of network-connected devices is associated with a first room in a household. For example, the media guidance application may identify a plurality of devices that are within a wireless range of an antenna situated in a garage of the user. The media guidance application may transmit a query to each of the devices in the garage and may, in response to transmitting the query, receive a response from each of the plurality of network devices indicating a status of the network-connected device. For example, the media guidance application may receive a packet indicating a status of the network-connected device such as a status (e.g., output value) of a sensor of the network-connected device, a setting of the network-connected device (e.g., a media asset being played back on the network-connected device), or a setting associated with the network-connected device (e.g., a value of a setting corresponding to hardware or software of the network-connected device).

The media guidance application may detect one or more changes in status in the first plurality of device settings. For example, the media guidance application may store, in a database, an array including respective previous values for settings of a plurality of settings associated with the network-connected devices. For example, the media guidance application may receive a setting of the network-connected device at a first time and may store the setting in the database subsequent to receiving the setting at the first time. The media guidance application may receive a second setting from the network-connected device at the second time, subsequent to the first time, and may compare the setting received at the first time to the setting received at the second time to determine whether the setting changed between the first time and the second time.

The media guidance application may detect a state of an object in a first room of a household in response to detecting the one or more changes in status of the first plurality of sensors. For example, the media guidance application may detect the one or more changes in the status of the first plurality of sensors based on receiving a packet from a network-connected device indicating that a setting (e.g., a value output by a sensor of the network-connected device) has changed. For example, the media guidance application may determine the status of a car in a garage (e.g., whether the car is running or not) in response to determining that a light in the garage turned from on to off. For example, the media guidance application may transmit a query to a computer associated with the car to retrieve a status of whether the car is running. In another example, the media guidance application may make a determination as to the status of the car based on a second sensor associated with a second network-connected device. For example, the media guidance application may determine whether the car is in the garage of the user based on a camera/microphone associated with a second network-connected device in the garage of the household (e.g., by detecting an image of a car at the camera sensor and by detecting an engine noise at the microphone of the second network-connected device).

The media guidance application may determine an environmental condition of the first room based on the one or more changes in status of the first plurality of device settings and the state of the object in the first room of the household. For example, the media guidance application may determine when the light turns from on to off and when the garage door changes from open to closed (e.g., the changes in status of the first plurality of devices) and when the car is not running (e.g., the status of the object) that the user has arrived home.

The media guidance application may identify a media consumption device in a second room in the household and may change a setting of the media consumption device based on the detected environmental condition. For example, the media guidance application may determine that when the user is arriving home, the media guidance application should instruct a television of the user to turn on (e.g., based on template received by the media guidance application from a profile associated with the household).

The media guidance application may determine whether the settings of the media consumption device of the second room are consistent with the environmental condition of the first room. For example, the media guidance application may determine, based on the template, that the television should be turned on when the user is arriving home. The media guidance application may retrieve a setting associated with the media consumption device (e.g., a status as to whether the media consumption device is turned on or off) and may determine, based on the status, whether the media guidance application needs to adjust a setting of the media consumption device. For example, the media guidance application may turn on the television when the media guidance application determines that the television is turned off and the user has arrived home.

The media guidance application may automatically adjust the setting of the media consumption device in a manner that is consistent with the environmental condition. For example, the media guidance application may compare the setting in the template with the setting of the television, as described above, and may adjust the setting of the television (e.g., by identifying an API associated with the television and transmitting a packet, formatted based on the API, to turn on the television). When the media guidance application determines that the setting at the media consumption device is consistent with the environmental condition (e.g., the setting in the template) the media guidance application may perform no action adjusting a setting of the media consumption device (e.g., leave the television on).

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

Figure 2:
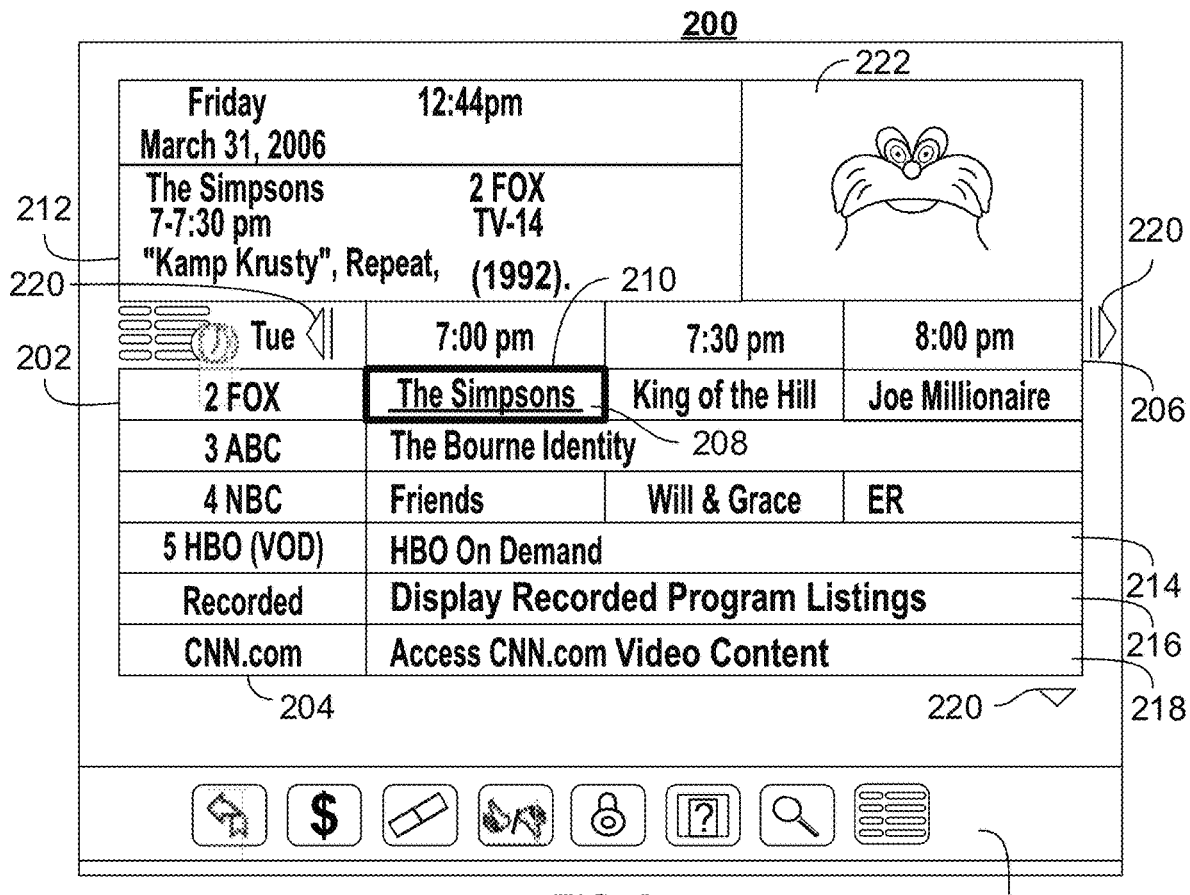
FIG. 2 shows an illustrative example of a media guidance display that may be presented in accordance with some embodiments of the disclosure.
Figure 3:
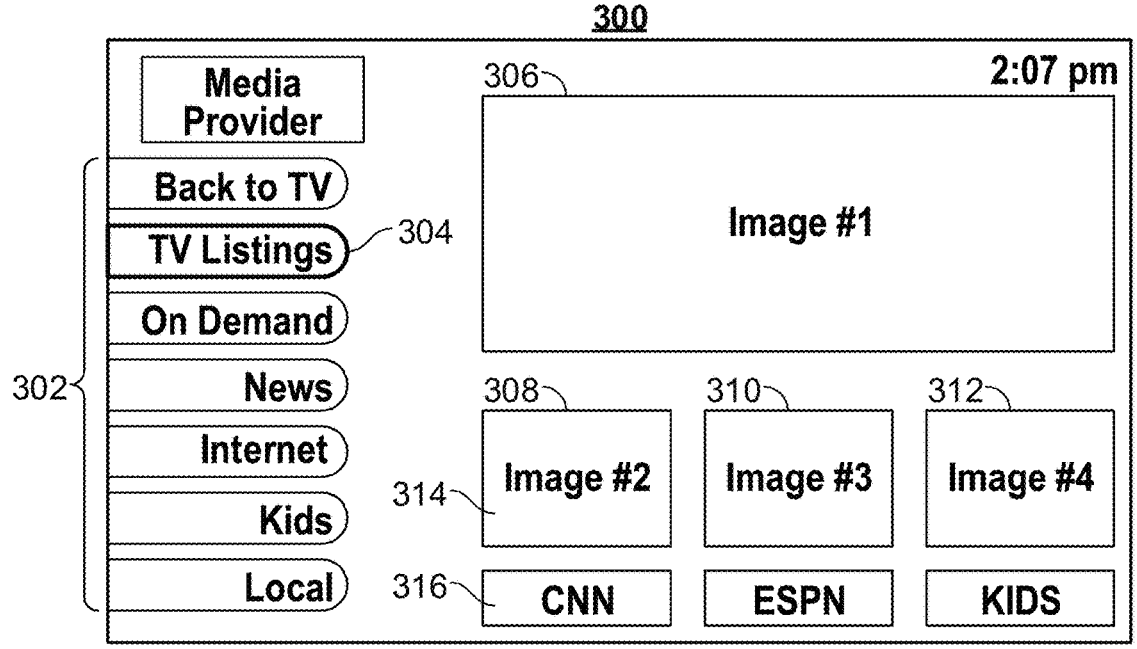
FIG. 3 shows another illustrative example of a media guidance display that may be presented in accordance with some embodiments of the disclosure.

One of the functions of the media guidance application is to provide media guidance data to users. FIGS. 1-3 show illustrative display screens that may be used to provide media guidance, and in particular media listings. The display screens shown in FIGS. 1-3 may be implemented on any suitable device or platform. While the displays of FIGS. 1-3 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), notification information (e.g., text, images, media clips, etc.), on-demand information, blogs, websites, and any other type of guidance data that is helpful for a user to navigate among and locate desired content selections.

In some embodiments, control circuitry 404, discussed further in relation to FIG. 4 below, executes instructions for a media guidance application stored in memory (i.e., control circuitry 408). Specifically, control circuitry 404 may be instructed by the media guidance application to perform the functions discussed above and below. For example, the media guidance application may provide instructions to control circuitry 404 to generate the media guidance displays discussed in relation to FIG. 1, FIG. 2, and FIG. 3. In some implementations, any action performed by control circuitry 404 may be based on instructions received from the media guidance application.

As referred to herein, the term "in response to" refers to initiated as a result of. For example, a first action being performed in response to a second action may include interstitial steps between the first action and the second action.

As referred to herein, the term "directly in response to" refers to caused by. For example, a first action being performed directly in response to a second action may not include interstitial steps between the first action and the second action.

It will be appreciated that while the discussion of media content has focused on video content, the principles of media guidance can be applied to other types of media content, such as music, images, etc.

FIG. 1 shows an illustrative household including multiple network-connected devices. Household 100 is depicted having multiple rooms, first room 102 and second room 110. First room 102 is depicted having multiple devices, such as lamp 104, and bed 106. Network-connected devices 104 and 106 may comprise sensors configured to measure environmental conditions in first room 102. Network-connected devices 104, 106, and 118 may be configured to communicate with other devices, such the media guidance application, via a network connection, such as a network connection in the household (e.g., communications network 514 discussed in relation to FIG. 5). For example, network-connected device 106 may comprise a sensor (e.g., pressure sensor) configured to detect user 108 when user 108 is positioned lying on network-connected device 106. Similarly, network-connected device 104 may comprise a sensor configured to determine when network-connected device 104 is outputting light from a lightbulb associated with network-connected device 104. Second room 110 is depicted having media consumption device 114 (e.g., a television) positioned within second room 110. Media consumption device 114 may be configured to output a variety of media, such as audio, video and combined audio and video presentations. User 116 is depicted in second room 110 wearing headphones 112. Headphones 112 may be configured to output audio of a media asset to user 116 but not to other users in household 100, such as user 108. Exemplary processes for adjusting settings of media consumption device 114 and headphones 112 based on the status of user 108, and settings and/or sensor statuses associated with network-connected devices 104, 106, and 118 of FIG. 1, are described below in detail in relation to FIGS. 6-10.

The media guidance application may receive, over a network associated with household 100, at a first time, a first plurality of device sensor states corresponding to a plurality of network-connected devices located in a first room of a household. For example, the media guidance application may be located on a network (e.g., communications network 514) of household 100 and may communicate with a plurality of devices, such as devices 104, 106, and 118 over communications network 514. The network-connected devices (e.g., devices 104, 106, and 118) may comprise sensors that can measure and detect changes in their environment (e.g., changes in first room 102) and convert those measurements to an electronic signal. The network-connected devices may quantize the signal to a value of a set of discrete values and may transmit the discrete values in a packet over communications network 514 to the media guidance application.

In an example, the media guidance application may transmit a query (e.g., via communications network 514) to the network-connected devices for a value of a signal output from the corresponding network-connected device. For example, the media guidance application may communicate, over the network, with a plurality of network-connected devices on the household's network, such as a network-connected lamp (e.g., device 104) and may determine, based on a status of a sensor associated with the lamp, whether a light bulb connected to the lamp is turned on or off. For example, the sensor associated with the lamp may be a register in memory of the network-connected lamp. In response to receiving a query from the media guidance application, the network-connected lamp (e.g., device 104) may receive, from the register, a value from memory indicating whether the light bulb associated with the lamp is turned on or turned off.

In some embodiments, the media guidance application may retrieve, from the network-connected devices, a plurality of device settings. For example, the media guidance application may receive a plurality of device settings from a single device (e.g., media guidance application may receive an indication of whether a bulb in a network-connected lamp is turned on, a current rating for the bulb, and an expected lifetime for the bulb, etc.), a single setting from a plurality of devices (e.g., an indication of whether a first light bulb is turned on at a first lamp and whether a second light bulb is turned on at a second lamp), or any combination of the above. For example, the media guidance application may communicate, over the network connection, with a network-connected lamp (e.g., device 104) to request a setting of a relay in the lamp that controls the flow of current to a bulb connected to the lamp. The media guidance application may determine whether the light is turned on or off based on the setting (e.g., based on a binary value indicating whether the relay is in an on or off position).

The media guidance application may detect, at a second time, a change in a sensor state for a sensor associated with the network-connected devices. For example, the media guidance application may communicate with a network-connected lamp (e.g., device 104) to determine when a light bulb associated with the lamp turns from off to on and/or from on to off. The media guidance application may transmit a query (e.g., via communications network 514) to the network-connected lamp (e.g., device 104) to determine whether the light bulb in the network-connected lamp is turned on or off (e.g., based on an amount of current measured by a current monitor of the network-connected lamp).

In another example, the media guidance application may configure the network-connected devices to transmit packets to the media guidance application in response to a change in state occurring for a sensor associated with the network-connected device. For example, the media guidance application may configure network-connected device to transmit a packet to the media guidance application whenever the network-connected device detects that there is a change in state at one of the sensors of the network-connected devices. For example, the media guidance application may configure an interrupt routine associated with the network-connected device (e.g., devices 104, 106, and 118) such that when the interrupt routine is activated (e.g., because of a change in a sensor output at a network-connected device), the network-connected device transmits a packet to the media guidance application indicating the change and/or the sensor status.

In some embodiments, the network-connected device may receive a network communication indicating a change in the state of the sensor. For example, the media guidance application may configure a network-connected lamp (e.g., device 104) to send a packet including a first payload to the media guidance application whenever a light switch of the lamp goes from on to off and a packet including a second payload when the light is switched from off to on. The media guidance application may detect the changes in status in response to receiving the packet by, for example, comparing the data in the packet to determine whether the packet contains the first payload or the second payload and determining a status of the light switch based on the payload (e.g., lamp changed from on to off when a packet is detecting having a first payload).

In some embodiments, the media guidance application may monitor the network associated with the household for packets indicating sensor states for sensors corresponding to the plurality of network-connected devices. For example, the media guidance application may monitor a network connection (e.g., communications network 514), for incoming packets from the network-connected devices. The media guidance application may detect a packet from the network-connected device (e.g., devices 104, 106, and 112) indicating the sensor state for the sensor associated with the network-connected device. For example, the media guidance application may identify an originator of the packet based on header information associated with the packet and may analyze the packet to determine whether a payload of the packet comprises data indicating a state of a sensor (e.g., based on a header of the payload portion of the packet).

In some embodiments, the media guidance application may receive, over the network associated with the household, at a first time, a first plurality of sensor states corresponding to the plurality of network-connected devices, such as a plurality of devices in first room 102 of household 100, by querying each of the first plurality of network-connected devices. For example, the media guidance application may retrieve a plurality of network addresses, each corresponding to a respective network-connected device of the plurality of network-connected devices. For example, the media guidance application may transmit, over a wireless network, a discovery packet to the devices on the same network. The media guidance application may determine, based on the devices that respond to the discovery packet, which devices are within a range of the media guidance application. Based on a computed range for the devices that respond to the discovery packet, the media guidance application may identify a first plurality of network-connected devices that are in first room 102.

For example, the media guidance application may store a network address table indicating a network address for each network-connected device (e.g., a smart bed and a smart lamp). The media guidance application may generate a network packet querying the network-connected device (e.g., a packet indicating a destination address of the smart lamp) for a sensor setting (e.g., for an indication as to whether a light is turned on or turned off).

In response to transmitting the query, the media guidance application may receive a response from each of the plurality of network-connected devices one or more sensor states associated with the respective network-connected device. For example, the media guidance application may transmit a query to each of the plurality of network-connected devices (e.g., a network-connected thermostat, light switch, television, etc.) and may receive an indication from each of those devices that indicates a setting or sensor state corresponding to the device. For example, the media guidance application may transmit a query to a computer, such as device 118, to determine what game, if any, is being played on the computer and may, in response to transmitting the query, receive an indication of a program displayed on the television (e.g., the state of the media displayed on the television).

In some embodiments, the media guidance application may store the current state or setting of the network-connected device in a database to detect whether there are changes in the state or setting of the network-connected device. For example, the media guidance application may store, in a database local to the media guidance application (e.g., storage 408) or remote to the media guidance application (e.g., media guidance data source 518), the setting or state value received at the first time. At a second time, the media guidance application may retrieve the stored state or setting from the database to determine whether the state or setting has changed between the first time and the second time (e.g., by comparing the state in the database with the state received from a network-connected device).

In some embodiments, the media guidance application may receive, at the second time from the network-connected device, one or more packets indicating the sensor state of the sensor associated with the network-connected device. For example, the media guidance application may detect a network packet, as described above, and may analyze data in the payload to determine whether the packet comprises information about a sensor state. In response to detecting that the packet comprises information about a sensor state, the media guidance application may store the sensor state in memory and may compare the sensor state received in the packet with a previous value for the sensor state. For example, the media guidance application may receive a packet from a network-connected lamp (e.g., device 104) indicating that the light switch is turned on. The media guidance application may compare the sensor state received in the packet with a previous sensor state (e.g., a sensor state received by the media guidance application at a time prior to the second time, stored in memory). The media guidance application may compare the sensor state with the previous sensor state to determine whether the sensor state changed. For example, the media guidance application may compare the state of the light (e.g., light on) with a previous sensor state stored in memory (e.g., light off). The media guidance application may determine, based on comparing the sensor state with the previous sensor state, whether there is a change in the state of the sensor. For example, the media guidance application may compare the state "light on" (e.g., indicated by a binary 1 value) with the state "light off" (e.g., indicted by a binary 0 value). When the media guidance application determines that the value of the current state differs from the value of the previous state, the media guidance application may determine that there has been a change in sensor state. When the media guidance application determines that there is no difference between a value of the current sensor state and a value of the previous sensor state, the media guidance application may determine that there has been no change in state for the sensor.

In response to detecting the change in the sensor state, the media guidance application may detect the state of an object located in the first room. For example, the media guidance application may determine whether a child (e.g., user 108) is sleeping in first room 102 when the media guidance application determines that the light in first room 102 turns from on to off (e.g., to determine whether the child is sleeping in room 102). For example, the media guidance application may communicate with the object over a network connection (e.g., a network-connected bed including a presence sensor such as a pressure sensor, a wearable device that tracks a movement of the user, etc.) to determine a state for the user (e.g., whether the user is sleeping in the bed with the light off). For example, the media guidance application may determine, based on communicating with the network-connected bed (e.g., device 106), whether the user is in the bed sleeping, in the bed reading, watching television, etc. For example, the media guidance application may determine that the user is in the bed sleeping when the media guidance application receives, from the network-connected bed, data indicating that a position of the user has not changed for a threshold amount of time (e.g., 10 minutes).

In some embodiments, the media guidance application may determine the state of the object in the first room based on searching a database of sensors and identifying a sensor capable of monitoring a state of the object. For example, the media guidance application may search a database listing monitoring capabilities associated with each sensor of the plurality of sensors (e.g., a monitoring capability of a wearable device may be a movement tracker for the user, or a pressure sensor in the bed of a user, etc.), of the plurality of sensors, capable of monitoring a state of the object located in the first room. For example, the media guidance application may determine the state of user 108 by locating a position of user 108 (e.g., based on a position of a wearable device, cell phone, etc., associated with tracking a position of the user) and may identify sensors capable of determining an activity (e.g., state) of the user by searching the database of sensors for a sensor that is associated with monitoring the user and is capable of monitoring the user in first room 102. For example, the media guidance application may determine that a camera associated with room 102 is capable of monitoring a presence of user 108 in room 102 (e.g., based on utilizing a face or object detection algorithm of the camera and comparing a detected object or face to a database storing a face of the user). The media guidance application may, based on the determination that the user is in first room 102, retrieve a list of sensors in first room 102. For example, the media guidance application may retrieve from a database a list of sensors that are in first room 102, or the media guidance application may query each of the plurality of devices in first room 102 (e.g., devices 104, 106, and 118) to determine what sensors and what capabilities are associated with the sensors of the devices.

The media guidance application may receive an output from the sensor capable of monitoring the state of the object located in the first room. For example, the media guidance application may communicate with the network-connected bed (e.g., via communications network 514) and may determine whether the user is in the bed or not (e.g., the state of the user) based on a state of a pressure sensor in the bed. The media guidance application may compare the output of the sensor to a mapping between sensor outputs and states of the first object to determine the state of the object. For example, the media guidance application may determine that the state of the sensor is a binary 1 corresponding to the bed being occupied. The media guidance application may compare the value of the state "1" to a table indicating a mapping between states of the sensor and states of the object and may determine that the pressure sensor outputs 1 when it senses pressure and therefore the bed is occupied by an object.

In some embodiments, the media guidance application may utilize information from multiple sensors to determine a status of the object. For example, the media guidance application may additionally receive data from a wearable device associated with user 108 and may combine the output of the wearable device and the output of the pressure sensor in the bed to determine whether the user is sleeping (e.g., when pressure is detected in the bed and when the wearable device has not detected movement by the user for a threshold amount of time).

The media guidance application may determine an environmental condition for the room based on comparing the state of the object with the sensor states of the plurality of network-connected devices. The media guidance application may compare the state of the object in the first room and the sensor state with object states and sensor states stored in a database, where the database stores one or more sensor states and one or more object states. For example, the media guidance application may determine that a light is switched from on to off and that user 108 is in first room 102 sleeping. The media guidance application may compare the sensor state (e.g., light off) and the object state (e.g., user 108 sleeping) to determine that the environmental condition is that the user 108 is sleeping in room 102 (e.g., because when a user has not moved for a threshold amount of time on a bed and the light is off in the room, the user is likely sleeping).

The media guidance application may determine an environmental condition for the first room, where the environmental condition for the first room corresponds to both the state of the object in the first room and the sensor state. For example, the media guidance application may identify a sensor state of the light switch (e.g., light off) and a state of the object (e.g., bed occupied) and may determine, based on the combination of the light switch changing from on to off and the bed detecting pressure being applied to its surface, that user 108 is sleeping in room 102.

In response to determining the environmental condition for the first room, the media guidance application may retrieve a template associated with the environmental condition including a setting for a media consumption device that is consistent with the environmental condition. For example, the media guidance application may lower a volume on a user's television when the media guidance application determines that the light is off in first room 102 and that the bed is occupied (e.g., because a user is likely sleeping in room 102 and does not want to be disturbed by media consumption device 114). For example, the media guidance application may retrieve, from a database, a template listing a plurality of commands for the media guidance application to transmit to media consumption device 114 in response to identifying the environmental condition (e.g., a command to lower a volume on the television when the media guidance application determines that the environmental condition of first room 102 is that the bed is occupied and the light is off).

In some embodiments, the media guidance application may compare each respective setting of the first plurality of settings with a corresponding setting of a second plurality of settings associated with the media consumption device. For example, the media guidance application may determine that the template identifies a plurality of settings for the media guidance application such as a setting to lower a volume of the television and to redirect the audio output by the media consumption device to a second audio output device, such as headphones 112. The media guidance application may determine, based on the template, whether the second plurality of settings associated with the media consumption device matches a corresponding setting of the second plurality of settings. For example, the media guidance application may determine whether the television is already at a low enough volume (e.g., a volume that is within a threshold range of volumes stored in the template) and may lower the volume on the television (e.g., media consumption device 114) when the media guidance application determines that the current volume output by the television is outside of a range of acceptable volumes defined in the template (e.g., to make the setting for the television consistent with the setting in the template).

In some embodiments, the media guidance application may retrieve a value associated with the setting in the template and may compare the value in the template to a value associated with a state of the sensor and may adjust a setting in the media consumption device to make the setting of the media consumption device consistent with that in the template. For example, the media guidance application may determine that the template identifies a value of 5 or lower for a volume level of the television when the media guidance application detects the environmental condition (e.g., the light switches from on to off and the bed is occupied). The media guidance application may query media consumption device 114 for a current level of the corresponding setting (e.g., the corresponding volume level) and may make the setting consistent with the setting in the template when the volume level is not consistent. For example, the media guidance application may determine that a current volume at the television is 9 a and may accordingly decrease the volume at the television to 5 or lower.

The media guidance application may identify, based on the attribute of the media consumption device, an API compatible with communicating commands to the media consumption device. For example, the media guidance application may identify an operating system running on the television and may generate a command to decrease the volume of the television that is compatible with the operating system running on the television. The media guidance application may generate one or more packets, based on the API, including a command to adjust a value of the setting of the media consumption device to the value associated with the setting in the template. For example, the media guidance application may identify a function in the API of the OS that adjusts the volume of the television and may generate a packet calling the function and including a desired volume value (e.g., 4, which is less than the maximum volume value identified in the template). The media guidance application may transmit the packet to the media consumption device over the network connection.

The media guidance application may iterate through each of the settings associated with the template and may compare those settings to corresponding settings associated with the television to determine whether the settings of the television are consistent with settings in the template. When the media guidance application determines that a setting is not consistent, the media guidance application may modify a setting of the television to make the setting in the television consistent with the setting in the template. For example, the media guidance application may determine that the template additionally has a setting for the brightness of media consumption device 114 and may adjust the brightness of media consumption device 114, in addition to adjusting the volume, when the brightness of media consumption device 114 is inconsistent with that in the template. For example, if the media guidance application determines that the brightness of the media consumption device is set to 10 but the template defines a maximum brightness of 5, the media guidance application may transmit an instruction to the media consumption device to lower the brightness from 10 to 5 (e.g., over communications network 514 using an API associated with media consumption device 114).

In some embodiments, the media guidance application may identify the template based on the setting or states of sensors of multiple network-connected devices. For example, the media guidance application may retrieve a template associated with the environmental condition (e.g., light turned off in the first room and the bed occupied). The media guidance application may retrieve a second sensor state of a plurality of sensor states in the template, where the second sensor state is associated with a second network-connected device of the plurality of network-connected devices. For example, the media guidance application may determine that the template identifies a second sensor setting, such as an ambient light setting, and may determine whether the template is appropriate based on the second sensor's setting. For example, the media guidance application may determine that the template identifies a television to turn on and a level of brightness for a screen of the television, when the media guidance application detects the environmental setting in the second room (e.g., second room 110). The media guidance application may further determine that the template applies or varies based on the ambient light in the room (e.g., when the ambient light is below a certain threshold, the screen brightness is set to a lower level than when the ambient brightness is set to a higher level). For example, when the media guidance application determines that the ambient light is above a certain threshold, the media guidance application may retrieve a different template (e.g., a template associated with the environmental condition for ambient light above a certain threshold that does not require turning on a light in the living room).

For example, the media guidance application may query the second network-connected device for a current state of a second sensor. For example, the media guidance application may transmit a query to the ambient light sensor to determine an ambient light level. The media guidance application may compare the current state of the sensor to the second sensor state in the template. For example, the media guidance application may determine that the second sensor state in the template defines a range of 0-5 out of 10. The media guidance application may determine that when the current state of the sensor (e.g., value from the ambient light sensor) is within the range, the template matches the environmental condition, and that when the value from the sensor is outside of the range, the template does not match the environmental condition.

In response to determining that the setting in the template is consistent with the setting associated with the media consumption device, the media guidance application may automatically adjust the settings of the media consumption device in a manner consistent with the environmental condition. For example, the media guidance application may adjust the setting of the media consumption device so that they are consistent with the setting or settings identified in the template. The media guidance application may compare settings in the template with corresponding settings associated with the media consumption device. For example, the media guidance application may receive a setting from the template indicating that the television should be turned on in response to detecting that the light has turned from on to off in the first room and the bed is occupied (e.g., the environmental condition).

The media guidance application may, in response to determining that the setting in the template is consistent with the setting associated with the media consumption device, maintain the setting of the media consumption device. For example, the media guidance application may keep the television turned on in response to determining that the television is already turned on.

In some embodiments, the media guidance application may determine that the media consumption device is outputting audio and video of a media asset at a media consumption device. For example, the media guidance application may query the media consumption device to determine whether the media consumption device is on, and if it is on, whether it is outputting audio and/or video. The media guidance application may determine, based on the template, that an audio output setting of the media consumption device is incompatible with an audio output setting in the template. For example, the media guidance application may determine the television not capable of outputting a volume that is consistent with the template, or may determine that the template defines a second device for outputting the audio of the media asset. For example, the media guidance application may determine that the template defines an audio output setting such as a setting for all audio to be output via headphones instead of the media consumption device.

In response to determining that the audio output setting of the media consumption device is incompatible with the audio output setting in the template, the media guidance application may adjust a setting of the media consumption device to be consistent with the audio output setting. For example, the media guidance application may determine that the television is outputting audio of the media asset via speakers of the media consumption device. The media guidance application may identify a second device, such as a pair of Bluetooth audio headphones identified in the template, that is consistent with the audio output setting and may redirect the audio of the media asset to the Bluetooth headphones to make the setting of the media consumption device consistent with that of the template. For example, the media guidance application may determine, based on a sensor in second room 110, that user 116 is consuming the media on media consumption device 114. Accordingly, the media guidance application may identify a headphone device associated with media consumption device 114 or associated with user 116 (e.g., based on receiving a profile of user 116 and identifying a headphone device associated with user 116, such as a default audio output device associated with the user). In response to identifying the second device, the media guidance application may make the settings of media consumption device 114 consistent with the template by ceasing output of audio at media consumption device 114 and beginning output of the audio at headphones 112. For example, the media guidance application may instruct the media consumption device to begin streaming the audio to headphones 112. In response to receiving the audio stream, headphones 112 may begin outputting the audio at the headphones for user 116. Accordingly, the settings of the media consumption device are consistent with the settings in the template because the audio of the media consumption device will not interrupt user 108 sleeping in first room 102 (e.g., determined, by the media guidance application, based on detecting that device 106 is occupied and that a light bulb of device 104 is turned off). This is just an exemplary embodiment of how the media guidance application may transmit media to a second device; in another example, the media guidance application may transmit the entirety of the media asset to a second device (e.g., audio and video) and may instruct the second device to generate for display the media asset at the second device instead of the first media consumption device.

The above description of FIG. 1 is merely illustrative and not limiting. Although the grid depicted in FIG. 1 depicts household 100 with two rooms (first room 102 and second room 110) any number of rooms is possible. Additionally, FIG. 1 depicts network-connected devices 104, 106, and 118, however any number of network-connected devices and configurations or capabilities of network devices is possible. Although media consumption device 114 is depicted as a television, media consumption device 114 may be any device capable of conveying media to a user, such as a stereo, tablet computer, augmented reality glasses, etc.

FIG. 2 shows illustrative grid program listings display 200 arranged by time and channel that also enables access to different types of media content in a single display. Display 200 may include grid 202 with: (1) a column of channel/media type identifiers 204, where each channel/media type identifier (which is a cell in the column) identifies a different channel or media type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP).

Grid 202 may provide listings for non-linear programming including on-demand listing 214, recorded media listing 216, and Internet content listing 218. A display combining listings for content from different types of media sources is sometimes referred to as a "mixed-media" display. The various permutations of the types of listings that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In other embodiments, listings for these media types may be included directly in grid 202. Additional listings may be displayed in response to the user selecting one of the navigational icons 220. (Pressing an arrow key on a user input device may affect the display in a similar manner as selecting navigational icons 220.)

Display 200 may also include video region 222, advertisement 224, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 224 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 202. Advertisement 224 may also be for products or services related or unrelated to the media content displayed in grid 202. Advertisement 224 may be selectable and provide further information about media content, provide information about a product or a service, enable purchasing of media content, a product, or a service, provide media content relating to the advertisement, etc. Advertisement 224 may be targeted based on a user's profile/preferences, monitored user activity, the type of display provided, or on other suitable targeted advertisement bases.

While advertisement 224 is shown as rectangular or banner shaped, advertisements may be provided in any suitable size, shape, and location in a guidance application display. For example, advertisement 224 may be provided as a rectangular shape that is horizontally adjacent to grid 202. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, I I I et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 226 may allow the user to access different types of media content, media guidance application displays, and/or media guidance application features. Options region 226 may be part of display 200 (and other display screens of the present invention), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 5.

Additional personalized media guidance application features are described in greater detail in Ellis et al., U.S. patent application Ser. No. 11/179,410, filed Jul. 11, 2005, Boyer et al., U.S. patent application Ser. No. 09/437,304, filed Nov. 9, 1999, and Ellis et al., U.S. patent application Ser. No. 10/105,128, filed Feb. 21, 2002, which are hereby incorporated by reference herein in their entireties.

Another display arrangement for providing media guidance is shown in FIG. 3. Video mosaic display 300 includes selectable options 302 for media content information organized based on media type, genre, and/or other organization criteria. In display 300, television listings option 304 is selected, thus providing listings 306, 308, 310, and 312 as broadcast program listings. Unlike the listings from FIG. 2, the listings in display 300 are not limited to simple text (e.g., the program title) and icons to describe media. Rather, in display 300 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 308 may include more than one portion, including media portion 314 and text portion 316. Media portion 314 and/or text portion 316 may be selectable to view video in full-screen or to view program listings related to the video displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Users may access media content and the media guidance application (and its display screens described above and below) from one or more of their user equipment devices. FIG. 4 shows a generalized embodiment of illustrative user equipment device 300. More specific implementations of user equipment devices are discussed below in connection with FIG. 5. User equipment device 400 may receive media content and data via input/output (hereinafter "I/O") path 402. I/O path 402 may provide media content (e.g., broadcast programming, on-demand programming, Internet content, and other video or audio) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry 406 such as processing circuitry based on one or more microprocessors, microcontrollers, digital signal processors, programmable logic devices, etc. In some embodiments, control circuitry 404 executes instructions for a media guidance application stored in memory (i.e., storage 408). In client-server based embodiments, control circuitry 404 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 408 that is part of control circuitry 404. Storage 408 may include one or more of the above types of storage devices. For example, user equipment device 400 may include a hard drive for a DVR (sometimes called a personal video recorder, or PVR) and a DVD recorder as a secondary storage device. Storage 408 may be used to store various types of media described herein and guidance application data, including program information, guidance application settings, user preferences or profile information, or other data used in operating the guidance application. Non-volatile memory may also be used (e.g., to launch a boot-up routine and other instructions).

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting media into the preferred output format of the user equipment 400. Circuitry 404 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may control the control circuitry 404 using user input interface 310. User input interface 410 may be any suitable user interface, such as a remote control, mouse, trackball, keypad, keyboard, touch screen, touch pad, stylus input, joystick, voice recognition interface, or other user input interfaces. Display 412 may be provided as a stand-alone device or integrated with other elements of user equipment device 400. Display 412 may be one or more of a monitor, a television, a liquid crystal display (LCD) for a mobile device, or any other suitable equipment for displaying visual images. In some embodiments, display 412 may be HDTV-capable. Speakers 414 may be provided as integrated with other elements of user equipment device 400 or may be stand-alone units. The audio component of videos and other media content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly implemented on user equipment device 400. In such an approach, instructions of the application are stored locally, and data for use by the application is downloaded on a periodic basis (e.g., from the VBI of a television channel, from an out-of-band feed, or using another suitable approach). In another embodiment, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server.

In yet other embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be a EBIF widget. In other embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program. In some embodiments, the guidance application may be generated by a remote server and transmitted to user equipment as a MPEG stream.

Figure 4:
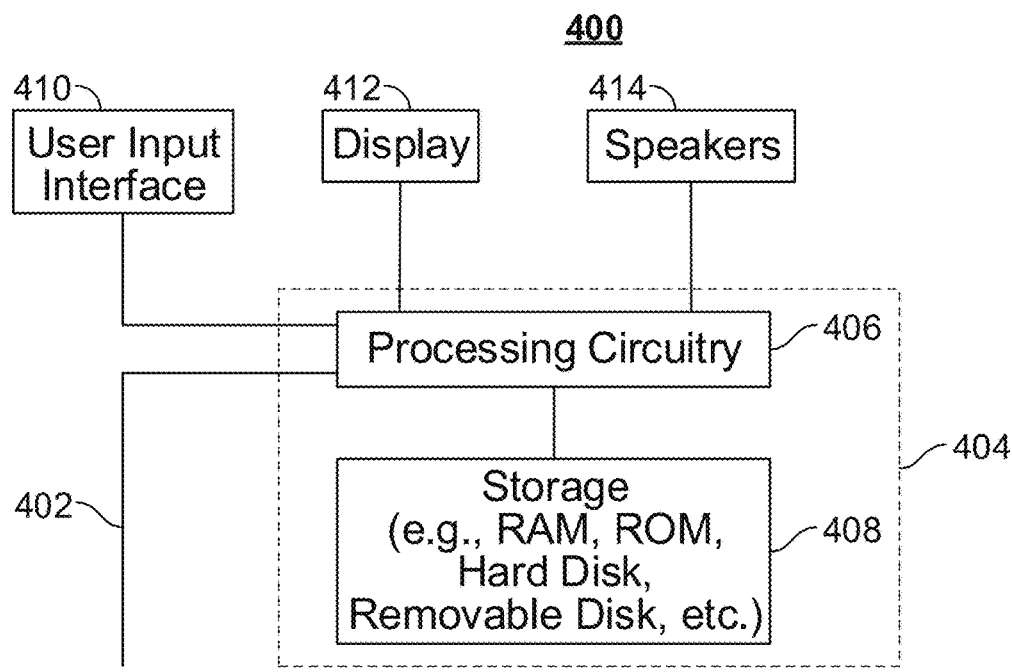
FIG. 4 is a block diagram of an illustrative user equipment device in accordance with some embodiments of the disclosure.
Figure 5:
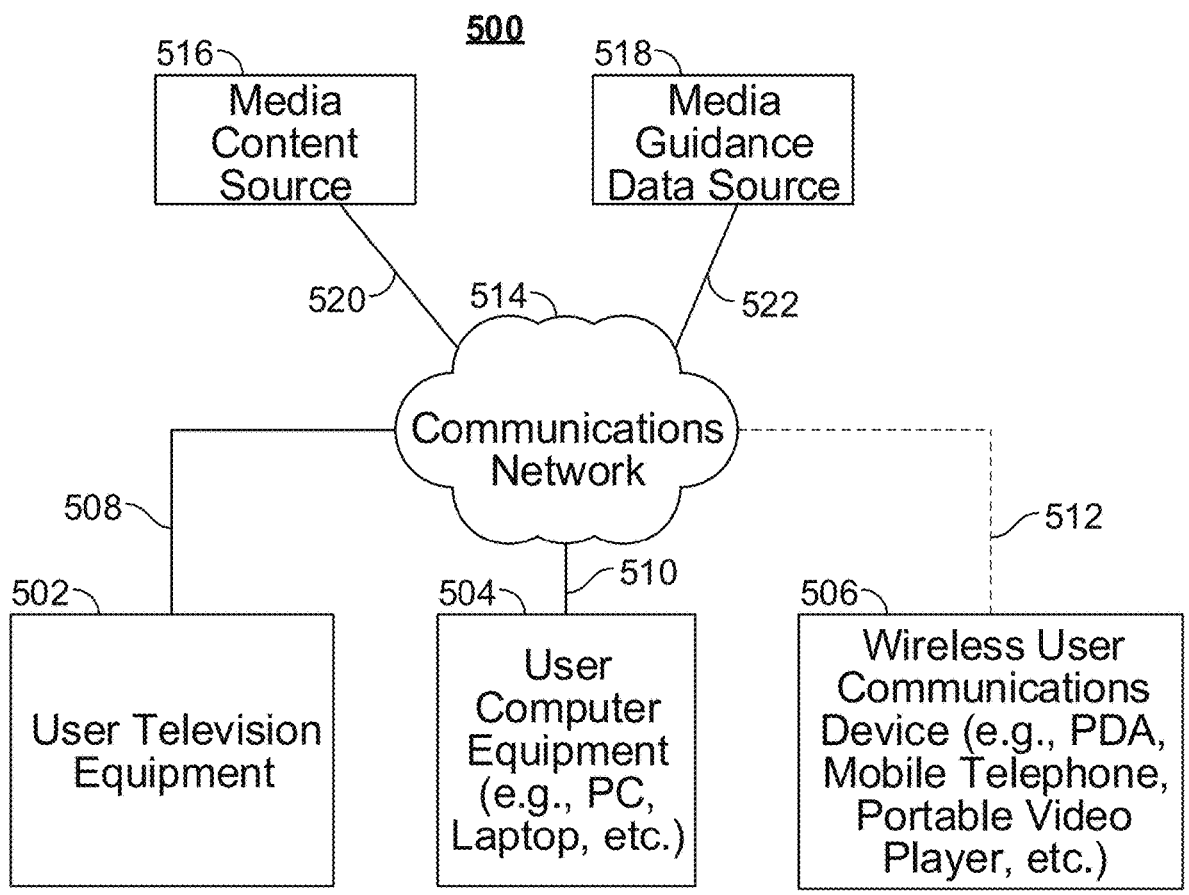
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing media, such as a non-portable gaming machine. For simplicity, these devices may be referred to herein collectively as user equipment or user equipment devices. User equipment devices, on which a media guidance application is implemented, may function as a stand-alone device or may be part of a network of devices. Various network configurations of devices may be implemented and are discussed in more detail below.

User television equipment 502 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 504 may include a PC, a laptop, a tablet, a WebTV box, a personal computer television (PC/TV), a PC media server, a PC media center, or other user computer equipment. WEBTV is a trademark owned by Microsoft Corp. Wireless user communications device 506 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 502, user computer equipment 504, and wireless user communications device 506 may utilize at least some of the system features described above in connection with FIG. 4 and, as a result, include flexibility with respect to the type of media content available on the device. For example, user television equipment 502 may be Internet-enabled allowing for access to Internet content, while user computer equipment 504 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 400, there is typically more than one of each type of user equipment device but only one of each is shown in FIG. 5 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile device (e.g., Blackberry) network, cable network, public switched telephone network, or other types of communications network or combinations of communications networks. BLACKBERRY is a service mark owned by Research In Motion Limited Corp. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths.

Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes media content source 516 and media guidance data source 518 coupled to communications network 514 via communication paths 520 and 522, respectively. Paths 520 and 522 may include any of the communication paths described above in connection with paths 508, 510, and 512. Communications with the media content source 516 and media guidance data source 518 may be exchanged over one or more communications paths, but are shown as a single path in FIG. 5 to avoid overcomplicating the drawing. In addition, there may be more than one of each of media content source 516 and media guidance data source 518, but only one of each is shown in FIG. 5 to avoid overcomplicating the drawing. (The different types of each of these sources are discussed below.) If desired, media content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 412.

Media content source 516 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 516 may be the originator of media content (e.g., a television broadcaster, a Webcast provider, etc.) or may not be the originator of media content (e.g., an on-demand media content provider, an Internet provider of video content of broadcast programs for downloading, etc.). Media content source 516 may include cable sources, satellite providers, on-demand providers, Internet providers, or other providers of media content. Media content source 516 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 518 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel).

Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 518 may be provided to users' equipment using a client-server approach. For example, a guidance application client residing on the user's equipment may initiate sessions with source 518 to obtain guidance data when needed. Media guidance data source 518 may provide user equipment devices 502, 504, and 506 the media guidance application itself or software updates for the media guidance application.

Media guidance applications may be, for example, stand-alone applications implemented on user equipment devices. In other embodiments, media guidance applications may be client-server applications where only the client resides on the user equipment device. For example, media guidance applications may be implemented partially as a client application on control circuitry 504 of user equipment device 500 and partially on a remote server as a server application (e.g., media guidance data source 518). The guidance application displays may be generated by the media guidance data source 518 and transmitted to the user equipment devices. The media guidance data source 518 may also transmit data for storage on the user equipment, which then generates the guidance application displays based on instructions processed by control circuitry.

Media guidance system 500 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 5.

In one approach, user equipment devices may communicate with each other within a home network. User equipment devices can communicate with each other directly via short-range point-to-point communication schemes describe above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In a third approach, users of user equipment devices inside and outside a home can use their media guidance application to communicate directly with media content source 516 to access media content. Specifically, within a home, users of user television equipment 504 and user computer equipment 506 may access the media guidance application to navigate among and locate desirable media content. Users may also access the media guidance application outside of the home using wireless user communications devices 506 to navigate among and locate desirable media content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

FIG. 6 is a flowchart of illustrative steps for adjusting a media consumption environment in accordance with some embodiments of the disclosure. For example, a media guidance application implementing process 600 may be executed by control circuitry 404. In some embodiments, instructions for executing process 600 may be encoded onto a non-transitory storage medium (e.g., storage 408) as a set of instructions to be decoded and executed by processing circuitry (e.g., processing circuitry 406). Processing circuitry may, in turn, provide instructions to other sub-circuits contained within control circuitry 404, such as the tuning, video generating, encoding, decoding, encrypting, decrypting, scaling, analog/digital conversion circuitry, and the like. It should be noted that process 600, or any step thereof, could be performed on, or provided by, any of the devices shown in FIGS. 1 and 4-5.

Process 600 begins at 602, where the media guidance application (e.g., via control circuitry 404) retrieves a first plurality of device settings corresponding to a plurality of network-connected devices, where each of the plurality of network-connected devices is associated with a first room in a household. For example, control circuitry 404 may communicate over communications network 514 to a plurality of devices such as devices 104, 106 and 118 by transmitting packets to each of the devices requesting a setting associated with each of the devices. In response to transmitting the packet, control circuitry 404 may receive, over communications network 514, packets from each of devices 104, 106 and 118 indicating the setting. Control circuitry 404 may store the settings in memory, such as storage 408, so that control circuitry 404 may compare a value of the setting stored in memory with a value of the setting received from one of the devices at a later time.

At 604, control circuitry 404 detects one or more changes in status in the first plurality of device settings. For example, control circuitry 404 may receive an updated value for the setting at a second time, subsequent to a first time where control circuitry 404 stored the value of the setting in storage 408. Control circuitry 404 may retrieve the value of the setting from storage 408 and may compare the value in storage 408 with a value received by control circuitry 404 over communications network 514 at a second time. Control circuitry 404 may detect a change in status of the first plurality of device settings when a setting received by control circuitry 404 at the second time does not match a value of the setting stored in storage 408.

At 606, control circuitry 404 detects a state of an object in the first room of the household. For example, control circuitry 404 may detect the status of an object in the first room, such as user 108 in first room 102, using any of the methods described above with respect to FIG. 1. For example, control circuitry 404 may identify a sensor capable of monitoring a status of the object and may request a state of the sensor to determine the status of the object. For example, control circuitry 404 may request a value from a pressure sensor embedded in device 106 and may determine that when the pressure sensor of device 106 indicates that the bed is occupied, that user 108 is in the room lying on the bed.

At 608, control circuitry 404 determines an environmental condition of the first room based on the one or more changes of status in the first plurality of device settings and the state of the object in the first room in the household. For example, control circuitry 404 may compare the state of the object (e.g., the user sleeping in the bed) and the change in the setting (e.g., light turned from on to off) and may determine that the environmental condition for room 102 is that a user is sleeping in the room.

At 610, control circuitry 404 identifies a media consumption device in a second room of the household. For example, control circuitry 404 may receive a template associated with the environmental condition (e.g., from a local storage 308 or remote storage such as media guidance data source 518). Control circuitry 404 may identify, based on the template, the media consumption device, such as media consumption device 114.

At 612, control circuitry 404 determines whether settings of the media consumption device in the second room are consistent with the environmental condition for the first room. For example, control circuitry 404 may receive settings for the media consumption device in the template and may compare the settings in the template to those settings at media consumption device 114 (e.g., by transmitting, over communications network 514, a packet requesting the settings of media consumption device 114 and comparing values associated with those settings with values for the settings identified in the template).

At 614, control circuitry 404 automatically adjusts the setting of the media consumption device in a manner consistent with the environmental condition. For example, control circuitry 404 may determine that the template defines a volume for the media consumption device between 0 and 5. Control circuitry 404 may transmit a request to the media consumption device to lower the volume to 5 if it is not already at a volume of 5 or lower.

It is contemplated that the steps or descriptions of FIG. 6 may be used with any other embodiment of this disclosure. In addition, the descriptions described in relation to the algorithm of FIG. 6 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 6 may be implemented on a combination of appropriately configured software and hardware, and that any of the devices or equipment discussed in relation to FIGS. 1 and 4-5 could be used to implement one or more portions of the process.

Figure 7:
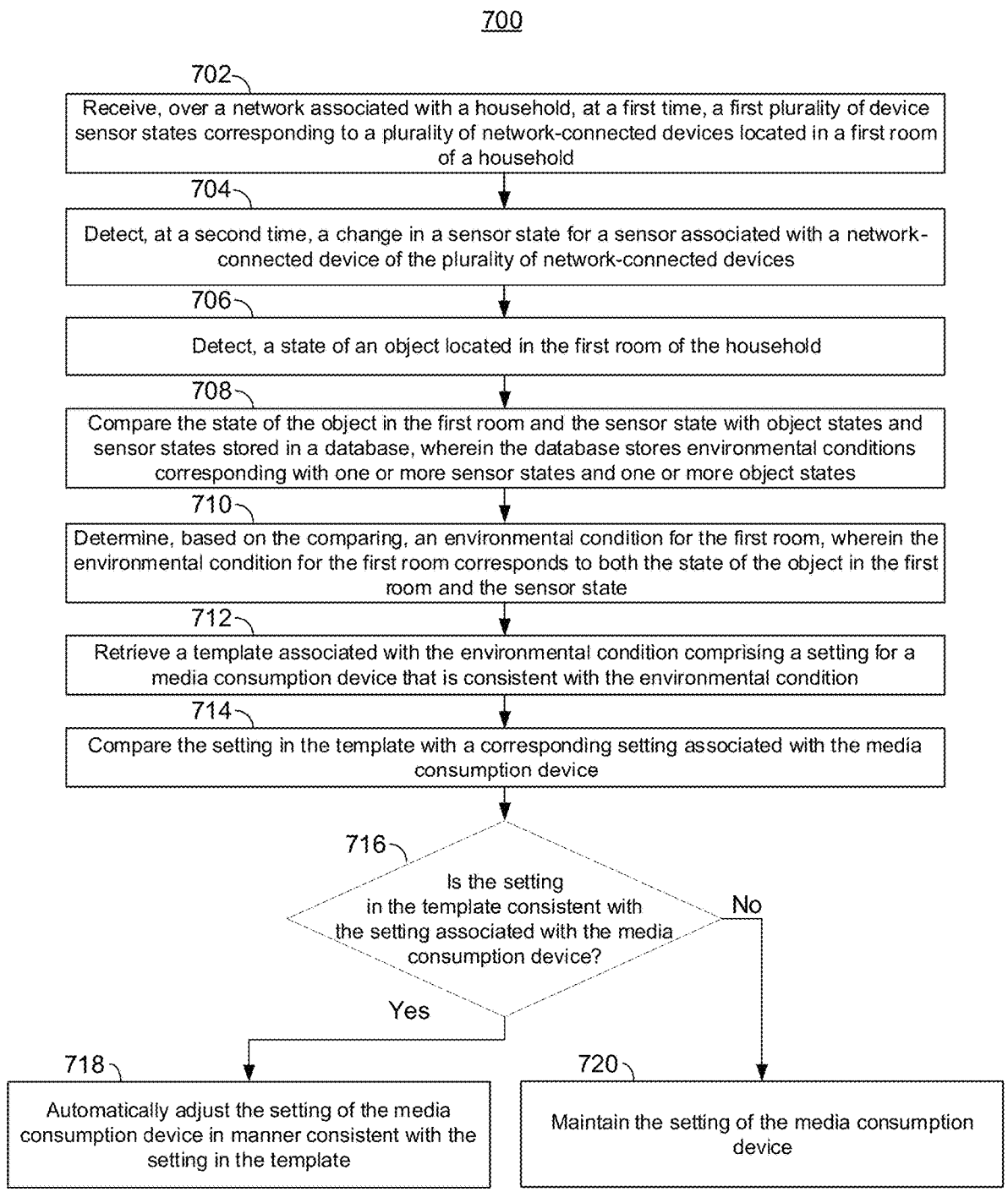
FIG. 7 depicts another illustrative process for adjusting a media consumption environment based on detecting a change in status of an object, in accordance with some embodiments of the disclosure.

FIG. 7 is a flowchart of illustrative steps for adjusting a media consumption environment, in accordance with some embodiments of the disclosure. For example, a media guidance application implementing process 700 may be executed by control circuitry 404. In some embodiments, instructions for executing process 700 may be encoded onto a non-transitory storage medium (e.g., storage 408) as a set of instructions to be decoded and executed by processing circuitry (e.g., processing circuitry 406). Processing circuitry may, in turn, provide instructions to other sub-circuits contained within control circuitry 404, such as the tuning, video generating, encoding, decoding, encrypting, decrypting, scaling, analog/digital conversion circuitry, and the like. It should be noted that process 700, or any step thereof, could be performed on, or provided by, any of the devices shown in FIGS. 1 and 4-5.

Process 700 begins at 702, where control circuitry 404 receives, over a network associated with a household, at a first time, a first plurality of device sensor states. As described above in relation to FIG. 6, step 602, control circuitry 404 may communicate with a plurality of network-connected devices in household 100, such as devices 104, 106, and 118, and may request from each of the devices a respective state of a sensor associated with each of the devices.

At 704, control circuitry 404 detects, at a second time, a change in a sensor state for a sensor associated with a network-connected device of the plurality of network-connected devices. For example, as described above in relation to FIG. 6, control circuitry 404 may receive a packet from a device of the plurality of devices (e.g., via communications network 514) indicating a change in a sensor state for a sensor associated with a network-connected device. Control circuitry 404 may detect a change in a sensor state when the packet indicates that a sensor state has changed or when control circuitry 404 compares the received sensor state to a previous sensor state stored in memory (e.g., a sensor state received at the first time, before the second time).

At 706, control circuitry 404 detects a state of an object located in the first room of the household. For example, as described with respect to FIG. 6, control circuitry 404 may detect the state of an object located in a first room of the household based on a sensor configurable to monitor the object.

At 708, control circuitry 404 compares the state of the object in the first room and the sensor state with object states and sensor states stored in a database, wherein the database stores environmental conditions corresponding to one or more sensor states and one or more object states. For example, control circuitry 404 may utilize the sensor state and the object state to look up a unique environmental condition in a database that corresponds to the sensor state and the object state. In some examples, control circuitry 404 may not identify an environmental condition in the database and may thereafter continue monitoring the sensor states and the object states until a configuration matching an environmental condition occurs. When control circuitry 404 identifies an environmental condition, control circuitry 404 may identify a template associated with the environmental condition.

At 710, control circuitry 404 determines, based on comparing an environmental condition for the first room, wherein the environmental condition for the first room corresponds to both the state of the object in the first room and the sensor state. For example, as discussed in FIG. 6, step 608, control circuitry 404 may determine an environmental condition based on the sensor states and the object state. Control circuitry 404 may compare the sensor states and the object state to the database as described in step 708 to identify the environmental condition.

At 712, control circuitry 404 retrieves a template associated with the environmental condition including a setting for a media consumption device that is consistent with the environmental condition. For example, control circuitry 404 may utilize the sensor state and the object state to look up a unique template in a database that corresponds to the sensor state and the object state (e.g., the environmental condition). In some examples, control circuitry 404 may not identify a template in the database and may therefore perform no further action on the media consumption device. When control circuitry 404 identifies a template, control circuitry 404 may identify a media consumption device defined in the template and may ensure that the settings of the media consumption device are consistent with those settings in the template.

At 714, control circuitry 404 compares the setting in the template with a corresponding setting associated with the media consumption device. For example, control circuitry 404 may request the setting of the media consumption device over network connection 514 and may compare the setting of the media consumption device to a setting defined in the template.

At 716, control circuitry 404 determines whether the setting in the template is consistent with the setting associated with the media consumption device. For example, control circuitry 404 may compare the setting of the media consumption device with the setting of the template as described above in step 714. When control circuitry 404 determines that the setting in the template matches a setting in the media consumption device, control circuitry 404 proceeds to step 720, where control circuitry 404 maintains the setting of the media consumption device. When control circuitry 404 determines that the setting in the media consumption device is not consistent with the setting in the template, control circuitry 404 proceeds to step 718, where control circuitry 404 updates the setting in the media consumption device (e.g., media consumption device 114) to be consistent with the setting in the template.

At 718, control circuitry 404 automatically adjusts the setting of the media consumption device in a manner consistent with the setting in the template. For example, control circuitry 404 may transmit (e.g., via communications network 514) to media consumption device 114 a packet formatted based on an API that is compatible with media consumption device 114 to adjust the setting. In response to receiving the packet at media consumption device 114, media consumption device 114 may adjust the setting of the media consumption device.

At 720, control circuitry 404 maintains the setting of the media consumption device. For example, control circuitry 404 may not alter a setting of media consumption device 114 in response to determining that the setting at media consumption device 114 is already consistent with the template.

It is contemplated that the steps or descriptions of FIG. 7 may be used with any other embodiment of this disclosure. In addition, the descriptions described in relation to the algorithm of FIG. 7 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 7 may be implemented on a combination of appropriately configured software and hardware, and that any of the devices or equipment discussed in relation to FIGS. 1 and 4-5 could be used to implement one or more portions of the process.

Figure 8:
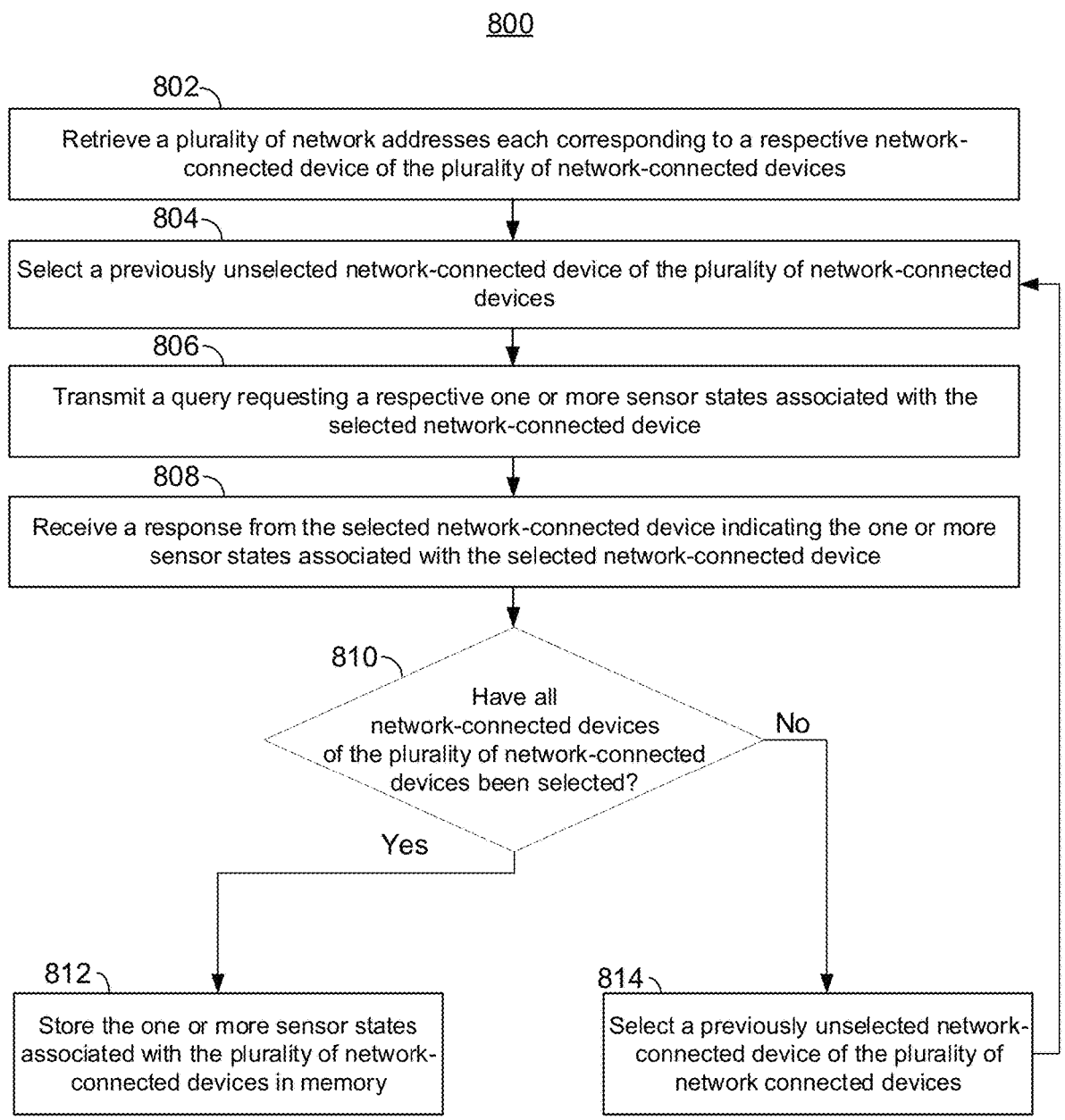
FIG. 8 depicts an illustrative process for identifying the states of sensors in the household, in accordance with some embodiments of the disclosure.

FIG. 8 is a flowchart of illustrative steps for identifying the states of sensors in a household in accordance with some embodiments of the disclosure. For example, a media guidance application implementing process 800 may be executed by control circuitry 404. In some embodiments, instructions for executing process 800 may be encoded onto a non-transitory storage medium (e.g., storage 408) as a set of instructions to be decoded and executed by processing circuitry (e.g., processing circuitry 406). Processing circuitry may, in turn, provide instructions to other sub-circuits contained within control circuitry 404, such as the tuning, video generating, encoding, decoding, encrypting, decrypting, scaling, analog/digital conversion circuitry, and the like. It should be noted that process 800, or any step thereof, could be performed on, or provided by, any of the devices shown in FIGS. 4-5.

Process 800 begins at 802, where control circuitry 404 retrieves a plurality of network addresses, each corresponding to a respective network-connected device of the plurality of network-connected devices. For example, control circuitry 404 may transmit a network discovery packet over communications network 514 and may receive the network addresses of the devices on the network in response to the transmission of the network discovery packet.

At 804, control circuitry 404 selects a network-connected device of the plurality of network-connected devices. For example, control circuitry 404 may select a previously unselected network device from the plurality of network-connected devices so that control circuitry 404 iterates through the plurality of network-connected devices to determine a sensor state for each network-connected device (e.g., devices 104, 106, and 118).

At 806, control circuitry 404 transmits the query requesting a respective one or more sensor states associated with the selected network-connected device. For example, as described above, control circuitry 404 may transmit over communications network 514 a packet requesting a sensor state from a network-connected device, such as device 104, 106, and 118.

At 808, control circuitry 404 receives a response from the selected network-connected device indicating the one or more sensor states associated with the selected network-connected device. For example, control circuitry 404 may receive a response form the network-connected device, such as a packet with a payload indicating a sensor status, from the network device (e.g., devices 104, 106, and 118).

At 810, control circuitry 404 determines whether all of the network-connected devices have been selected. For example, control circuitry 404 may determine whether control circuitry 404 has transmitted a request to each of the network devices that responded to the network discovery packet at 802. When control circuitry 404 determines that not all of the network devices have been selected, control circuitry 404 will select a previously unselected network-connected device and will proceed to 806. Otherwise, control circuitry 404 proceeds to 812, where control circuitry 404 stores the one or more sensor states associated with the plurality of network-connected devices in memory. For example, at 812, control circuitry 404 may update an array including an indication of the device sensor and a state to include an updated state received at 808.

It is contemplated that the steps or descriptions of FIG. 8 may be used with any other embodiment of this disclosure. In addition, the descriptions described in relation to the algorithm of FIG. 8 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 8 may be implemented on a combination of appropriately configured software and hardware, and that any of the devices or equipment discussed in relation to FIGS. 1 and 4-5 could be used to implement one or more portions of the process.

Figure 9:
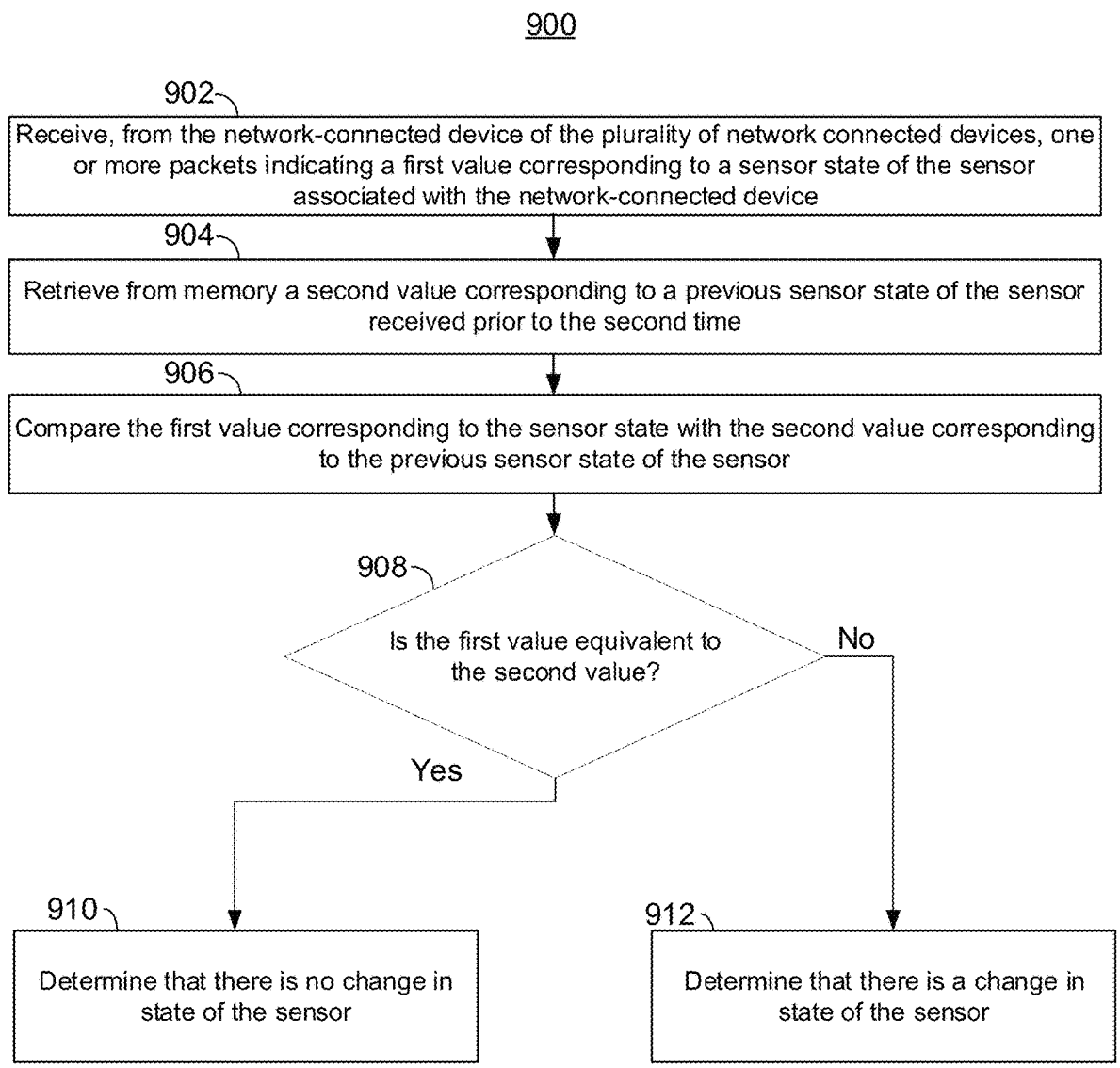
FIG. 9 depicts an illustrative process for detecting state changes for sensors in the household, in accordance with some embodiments of the disclosure.

FIG. 9 is a flowchart of illustrative steps for detecting a state change for sensors in a household, in accordance with some embodiments of the disclosure. For example, a media guidance application implementing process 900 may be executed by control circuitry 404. In some embodiments, instructions for executing process 900 may be encoded onto a non-transitory storage medium (e.g., storage 408) as a set of instructions to be decoded and executed by processing circuitry (e.g., processing circuitry 406). Processing circuitry may, in turn, provide instructions to other sub-circuits contained within control circuitry 404, such as the tuning, video generating, encoding, decoding, encrypting, decrypting, scaling, analog/digital conversion circuitry, and the like.

It should be noted that process 900, or any step thereof, could be performed on, or provided by, any of the devices shown in FIGS. 1 and 4-5.

Process 900 begins at 902, where control circuitry 404 receives, from the network-connected device of the plurality of network-connected devices, one or more packets indicating a first value corresponding to a sensor state of the sensor associated with the network-connected device. For example, as described in relation to FIG. 8, control circuitry 404 may receive a sensor state of the plurality of sensor states associated with a device, such as devices 104, 106, and 118, over network connection 514.

At 904, control circuitry 404 retrieves from memory a second value corresponding to a previous sensor state of the sensor received prior to the second time. For example, as described above in relation to FIG. 1 and FIG. 8, control circuitry 404 may store the sensor states in memory, such as storage 408. Control circuitry 404 may retrieve the sensor states from the memory and may compare the sensor state (e.g., the previous sensor state stored in the memory) with the sensor state received by the control circuitry (e.g., the sensor state received by control circuitry 404 subsequent to receiving the sensor state stored in memory).

At 906, control circuitry 404 compares the first value corresponding to the sensor state with the second value corresponding to the previous sensor state of the sensor. For example, control circuitry 404 may compare the value of the previous sensor state stored in memory with the value of the sensor state received via network connection 514.

At 908, control circuitry 404 determines whether the first value is equivalent to the second value. For example, control circuitry 404 may compare the first value to the second value and may determine, when the first value is within a threshold range from the second value, that the two values are equivalent. Control circuitry 404 may retrieve the threshold range from memory, such as storage 408, based on determining a type for the values. For example, control circuitry 404 may determine that an audio measurement has a high margin of error and may therefore identify a range at +/−5%, whereas a current measurement may have a low margin of error and may therefore define the range as +/−1%. If control circuitry 404 determines that the first value is within the range of the second value, control circuitry 404 proceeds to 910, where control circuitry 404 determines that there is no change in the state of the sensor. If control circuitry 404 determines that the first value is not within the range of the second value, control circuitry 404 proceeds to 912, where control circuitry 404 determines that there is a change in the state of the sensor.

It is contemplated that the steps or descriptions of FIG. 9 may be used with any other embodiment of this disclosure. In addition, the descriptions described in relation to the algorithm of FIG. 9 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 9 may be implemented on a combination of appropriately configured software and hardware, and that any of the devices or equipment discussed in relation to FIGS. 4-5 could be used to implement one or more portions of the process.

Figure 10:
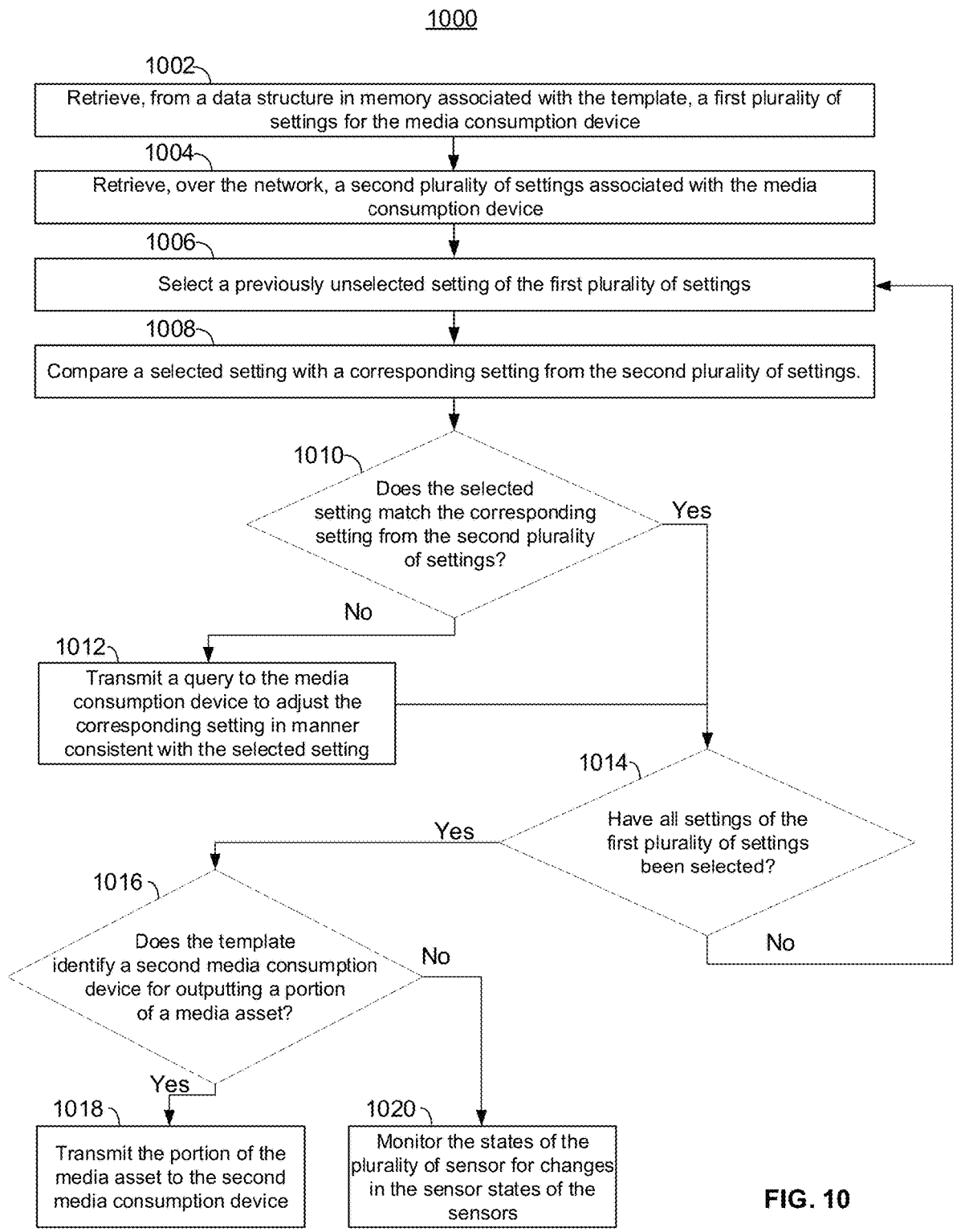
FIG. 10 depicts an illustrative process for adjusting settings on a media consumption device, in accordance with some embodiments of the disclosure.

FIG. 10 is a flowchart of illustrative steps for adjusting a setting on a media consumption device, in accordance with some embodiments of the disclosure. For example, a media guidance application implementing process 1000 may be executed by control circuitry 404. In some embodiments, instructions for executing process 1000 may be encoded onto a non-transitory storage medium (e.g., storage 408) as a set of instructions to be decoded and executed by processing circuitry (e.g., processing circuitry 406). Processing circuitry may, in turn, provide instructions to other sub-circuits contained within control circuitry 404, such as the tuning, video generating, encoding, decoding, encrypting, decrypting, scaling, analog/digital conversion circuitry, and the like. It should be noted that process 1000, or any step thereof, could be performed on, or provided by, any of the devices shown in FIGS. 1 and 4-5.

Process 1000 begins at 1002, where control circuitry 404 retrieves, from a data structure in memory associated with the template, a first plurality of settings for the media consumption device. For example, control circuitry 404 may retrieve an array from storage 408 indicating a plurality of setting for the media consumption device that are consistent with a detected environmental condition (e.g., an environmental condition detected by control circuitry 404).

At 1004, control circuitry 404 retrieves, over the network, a second plurality of settings associated with the media consumption device. For example, control circuitry 404 may receive a plurality of settings associated with the media consumption device by transmitting a query to the media consumption device over network 514 requesting the settings. In response to transmitting the query, control circuitry 404 may receive the requested settings via communications network 514 and may store the requested settings in memory 308.

At 1006, control circuitry 404 selects a previously unselected setting of the first plurality of settings. For example, control circuitry 404 may select a setting from the first plurality of settings that has not yet been selected by control circuitry 404. After selecting the previously unselected setting, control circuitry 404 proceeds to 1006, where control circuitry 404 compares the setting with a corresponding setting from the second plurality of settings.

At 1008, control circuitry 404 compares a selected setting with a corresponding setting from the second plurality of settings. For example, control circuitry 404 may select a previously unselected setting from the plurality of settings so that control circuitry 404 may iterate through the settings of the plurality of settings and compare the settings to those of the media consumption device.

At 1010, control circuitry 404 determines whether the selected setting matches the corresponding setting from the second plurality of settings associated with the media consumption device. For example, control circuitry 404 may compare a value of the setting of the first plurality of settings with a value of the second plurality of settings. When control circuitry 404 determines that the value of the selected setting matches the value of the corresponding setting from the second plurality of settings, control circuitry 404 proceeds to 1014, where control circuitry 404 determines whether all of the settings have been compared by control circuitry 404. Otherwise, control circuitry 404 proceeds to 1012, where control circuitry 404 transmits a query to the media consumption device to adjust the corresponding setting in a manner consistent with the selected setting.

At 1012, control circuitry 404 transmits a query to the media consumption device to adjust the corresponding setting in a manner consistent with the selected setting. For example, control circuitry 404 may transmit the value of the setting in the template and a command to the media consumption device over communications network 514 to adjust the setting. In response to receiving the value and the command, the network consumption device may adjust the corresponding setting to the value.

At 1014, control circuitry 404 determines whether all settings of the first plurality of settings for the media consumption device have been selected. For example, control circuitry 404 may determine whether control circuitry 404 has selected each of the settings included in the template. If control circuitry 404 determines that it has not selected each of the settings in the template, control circuitry 404 proceeds to 1006, where control circuitry 404 selects a previously unselected setting of the first plurality of settings. If control circuitry 404 determines that it has selected all of the settings of the first plurality of settings, control circuitry 404 proceeds to 1016, where control circuitry 404 determines whether the template identifies a second media consumption device for outputting a media asset.

At 1016, control circuitry 404 determines whether the template identifies a second media consumption device for outputting a portion of the media asset. For example, control circuitry 404 may determine that the template identifies a second media consumption device, such as a pair of headphones for outputting audio of the media. When control circuitry 404 detects the second media consumption device in the template, control circuitry 404 proceeds to 1018, where control circuitry 404 transmits a portion of the media asset to the second media consumption device. When control circuitry 404 does not detect a second media consumption device in the template, control circuitry 404 proceeds to 1020 where control circuitry 404 proceeds to monitor the states of the plurality of sensors for changes in the sensor states of the sensors, as described further in relation to FIG. 8.

At 1018, control circuitry 404 transmits a portion of the media asset to the second media consumption device. For example, control circuitry 404 may detect the second media consumption device based on network address or a unique identifier for the second media consumption device included in the template. Control circuitry 404 may communicate with the second media consumption device, such as headphones 112, to transmit audio of the media asset to headphones 112. For example, control circuitry 404 may instruct headphones 112 to retrieve audio of the media asset from media content source 516 via communications network 514 or may instruct media consumption device 114 to stream the audio of the media asset to headphones 112 (e.g., via a Bluetooth connection).

It is contemplated that the steps or descriptions of FIG. 10 may be used with any other embodiment of this disclosure. In addition, the descriptions described in relation to the algorithm of FIG. 10 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 10 may be implemented on a combination of appropriately configured software and hardware, and that any of the devices or equipment discussed in relation to FIGS. 1 and 4-5 could be used to implement one or more portions of the process.

Figure 11:
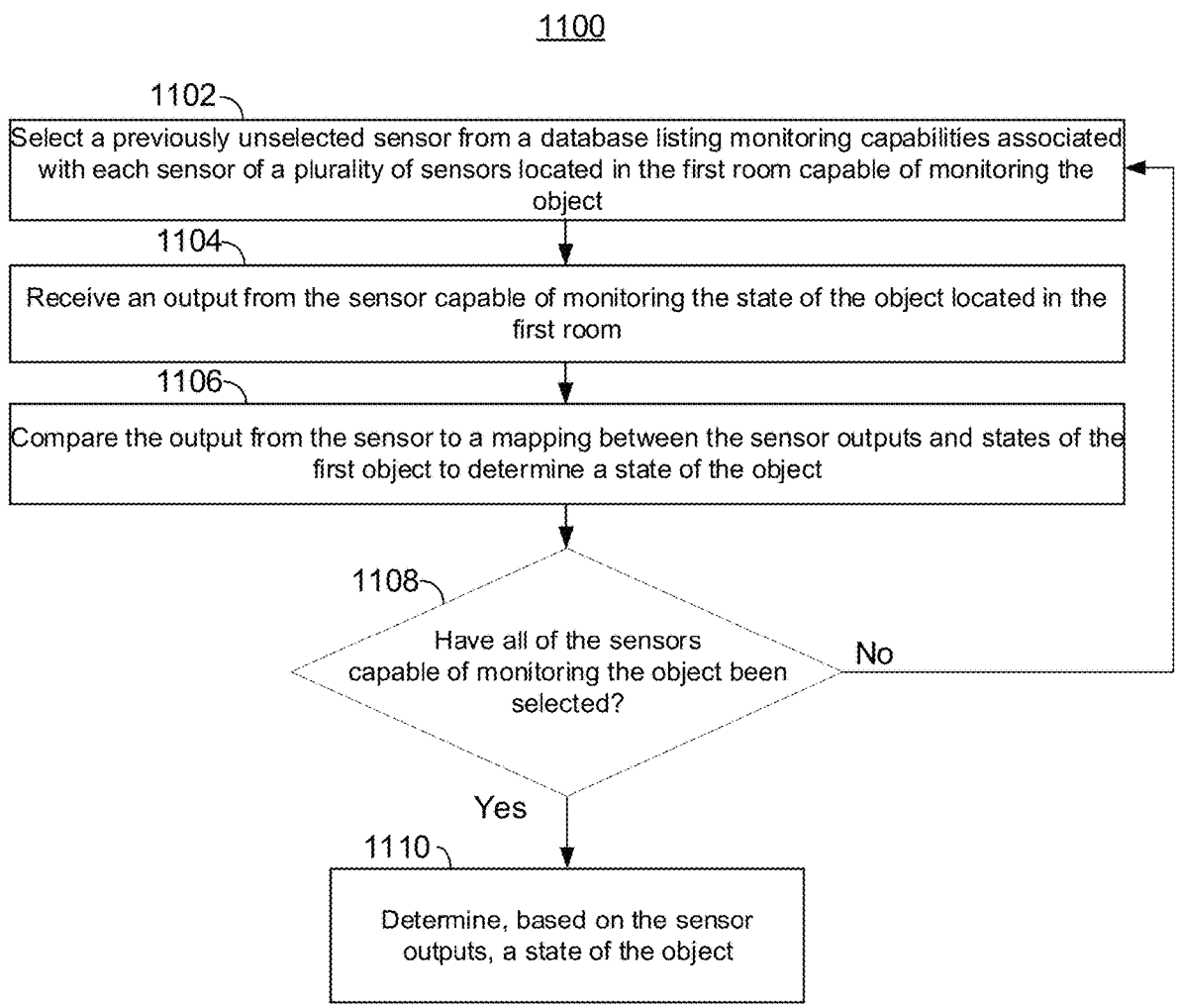
FIG. 11 depicts an illustrative process for determining a state of an object, in accordance with some embodiments of the disclosure.

FIG. 11 is a flowchart of illustrative steps for adjusting a setting on a media consumption device, in accordance with some embodiments of the disclosure. For example, a media guidance application implementing process 1100 may be executed by control circuitry 404. In some embodiments, instructions for executing process 1100 may be encoded onto a non-transitory storage medium (e.g., storage 408) as a set of instructions to be decoded and executed by processing circuitry (e.g., processing circuitry 406). Processing circuitry may, in turn, provide instructions to other sub-circuits contained within control circuitry 404, such as the tuning, video generating, encoding, decoding, encrypting, decrypting, scaling, analog/digital conversion circuitry, and the like. It should be noted that process 1100, or any step thereof, could be performed on, or provided by, any of the devices shown in FIGS. 1 and 4-5.

Process 1100 begins at 1102, where control circuitry 404 selects a previously unselected sensor from a database listing monitoring capabilities associated with each sensor of a plurality of sensors located in the first room capable of monitoring the object. For example, control circuitry 404 may access a database stored in storage 308 and may identify, based on the database, a plurality of sensors capable of monitoring the state of the object. Control circuitry 404 may select a previously unselected sensor to iterate through the sensors capable of monitoring the object to determine a state of the object.

At 1104, control circuitry 404 receives an output from the sensor capable of monitoring the state of the object located in the first room. For example, control circuitry 404 may transmit a query to a sensor associated with a network-connected device in the first room and may receive, in response to transmitting the query, a packet indicating a current output from the sensor.

At 1006, control circuitry 404 compares the output from the sensor to a mapping between the sensor outputs and states of the first object to determine a state of the object. For example, control circuitry 404 may determine that when a pressure sensor in a bed of the user detects that there is pressure on the bed, the state of the bed is occupied. Control circuitry 404 may store the state in memory and may access the state at a later time to determine a state of the object, such as the state of the user based on output from the sensor in the bed and a sensor output from a wearable device of the user.

At 1108, control circuitry 404 determines whether all of the sensors capable of monitoring the object have been selected. For example, control circuitry 404 may determine whether control circuitry 404 has selected each of the sensors from the database that are capable of monitoring the object. When control circuitry 404 determines that not all of the sensors have been selected, control circuitry 404 proceeds to 1102, where control circuitry 404 selects a previously unselected sensor and begins the process to receive data from the sensor. When control circuitry 404 determines that all of the sensors capable of monitoring the object have been selected, control circuitry 404 proceeds to 1110 to determine, based on the sensor outputs, a state of the object. For example, control circuitry 404 may utilize a combination of the sensor outputs to determine the state of the object. For example, control circuitry 404 may utilize the state of the pressure sensor in the bed and a state of a movement sensor in a wearable device of the user to determine whether the user is sleeping in the bed (e.g., by determining that the pressure sensor detects a presence of the user and a sensor in the wearable device detects no movement by the user.

It is contemplated that the steps or descriptions of FIG. 11 may be used with any other embodiment of this disclosure. In addition, the descriptions described in relation to the algorithm of FIG. 11 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 11 may be implemented on a combination of appropriately configured software and hardware, and that any of the devices or equipment discussed in relation to FIGS. 1 and 4-5 could be used to implement one or more portions of the process.

Figure 12:
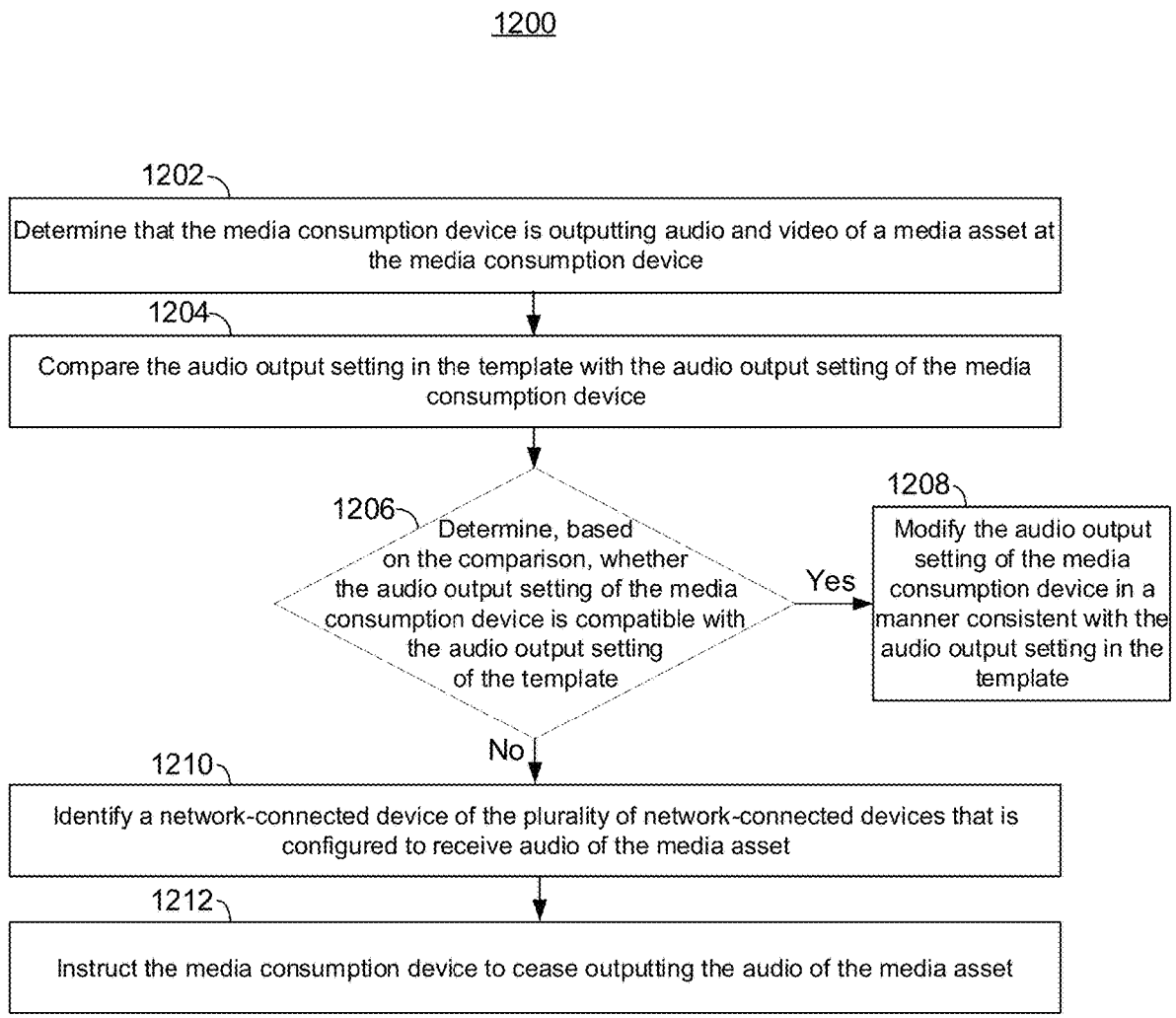
FIG. 12 depicts an illustrative process for outputting of audio of a media asset on a second device, in accordance with some embodiments of the disclosure.

FIG. 12 is a flowchart of illustrative steps for adjusting a setting on a media consumption device, in accordance with some embodiments of the disclosure. For example, a media guidance application implementing process 1200 may be executed by control circuitry 404. In some embodiments, instructions for executing process 1200 may be encoded onto a non-transitory storage medium (e.g., storage 408) as a set of instructions to be decoded and executed by processing circuitry (e.g., processing circuitry 406). Processing circuitry may, in turn, provide instructions to other sub-circuits contained within control circuitry 404, such as the tuning, video generating, encoding, decoding, encrypting, decrypting, scaling, analog/digital conversion circuitry, and the like. It should be noted that process 1200, or any step thereof, could be performed on, or provided by, any of the devices shown in FIGS. 1 and 4-5.

Process 1200 begins at 1202, where control circuitry 404 determines that the media consumption device is outputting audio and video of a media asset in the media consumption device. For example, control circuitry 404 may transmit a query to the media consumption device requesting a current state of the media consumption device (e.g., media consumption device 114). In response to transmitting the query, control circuitry 404 may receive a packet from media consumption device 114 indicating that the media consumption device is generating for display a media asset and is outputting audio of the media asset.

At 1204, control circuitry 404 compares the audio output setting in the template with the audio output setting of the media consumption device. For example, control circuitry 404 may receive an audio output setting of the media consumption device, by requesting the audio output setting from the media consumption device as described above. Control circuitry 404 may compare the audio output setting (e.g., a setting to output audio via speakers of media consumption device 114 via speaker 414).

At 1206, control circuitry 404 determines, based on the comparison, whether the audio output setting of the media consumption device is compatible with the audio output setting of the template. For example, control circuitry 404 may compare the audio output setting of media consumption device 114 to output audio of the media asset via speakers 414 to a setting in the template to output audio of the media asset via a pair of headphones. In response to determining that the output setting of the media consumption device is not compatible with the audio output setting of the template, control circuitry 404 proceeds to 1210, where control circuitry 404 identifies a device compatible with the audio output setting. If control circuitry 404 determines that the audio output setting of the media consumption device is consistent with the audio output setting of the template, control circuitry 404 proceeds to 1208 where control circuitry 404 modifies the audio output setting of the media consumption device in a manner that is consistent with the audio output setting in the template, as discussed in detail in relation to FIG. 1, FIG. 6, and FIG. 7.

At 1210, control circuitry 404 identifies a network-connected device of the plurality of network-connected devices that is configured to receive audio of the media asset. For example, control circuitry 404 may determine that the media consumption device is configured, via a Bluetooth wireless connection, to communicate with a pair of headphones, such as headphones 112. For example, control circuitry 404 may look up a device of a plurality of devices in a database that are compatible with outputting audio of the media asset and may identify the second device based on a determination that the second device is compatible with the audio output setting. Control circuitry 404 may instruction the media consumption device to transmit (e.g., stream) the audio of the media asset to the headphones where the headphones can output the audio to a user (e.g., user 116).

At 1212, control circuitry 404 instructs the media consumption device to cease outputting the audio of the media asset. For example, control circuitry 404 may instruct the media consumption device to cease outputting the audio of the media asset from the speakers associated with the media consumption device so that the audio of the media asset is only output via the headphones. Therefore, control circuitry 404 adjusts the settings of the media consumption device so that they are consistent with the environmental condition where user 108 is sleeping in first room 102 while user 116 is consuming media in second room 110.

It is contemplated that the steps or descriptions of FIG. 12 may be used with any other embodiment of this disclosure. In addition, the descriptions described in relation to the algorithm of FIG. 12 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 12 may be implemented on a combination of appropriately configured software and hardware, and that any of the devices or equipment discussed in relation to FIGS. 1 and 4-5 could be used to implement one or more portions of the process.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   detecting that a first media consumption device is outputting a media asset;
   detecting a presence of a first user and a second user in a vicinity of the first media consumption device;
   determining, based on a sensor input, that the first user is asleep; and
   based at least in part on (a) the determining that the first user is asleep and (b) the detecting the presence of the first user and the second user in the vicinity of the first media consumption device:
      causing the output of the media asset to be transitioned to a second media consumption device.

2. The method of claim 1, wherein the media asset comprises and audio component and a video component, and wherein causing the output of the media asset to be transitioned to a second media consumption device comprises:
   causing the output of the audio component to be transitioned to the second media consumption device; and
   causing the output of the video component to continue to be output by the first media consumption device.

3. The method of claim 1, further comprising:
   detecting that the first media consumption device comprises a first output capability; and
   selecting the second media consumption device, from a plurality of media consumption devices, based on determining that the second media consumption device comprises a second output capability, different from the first output capability.

4. The method of claim 3, wherein the first output capability corresponds to an audio output capability of the first media consumption device and the second output capability corresponds to a second audio output capability of the second media consumption device.

5. The method of claim 3, further comprising:
   determining the first output capability based on a first device type of the first media consumption device; and
   determining the second output capability based on a second device type of the first media consumption device.

6. The method of claim 1, wherein the first user is located in a first room and the second user is located in a second room.

7. The method of claim 1, wherein detecting the presence of the first user and the second user in the vicinity of the first media consumption device comprises:
   detecting a first portable device that is associated with the first user; and
   detecting a second portable device that is associated with the second user.

8. The method of claim 1, wherein the sensor input is a movement sensor input, and wherein determining that the first user is asleep comprises detecting, based on the movement sensor input, that the first user has not moved within a threshold period of time.

9. The method of claim 1, wherein determining that the first user is asleep further comprises determining that a light corresponding to a room of the first user is off.

10. The method of claim 1, further comprising, based at least in part on the determining that the first user is asleep:
    determining that an audio volume of the output of the first media asset on the first media consumption device exceeds a threshold value;
    causing the audio volume of the output of the first media asset on the first media consumption device to be lowered; and detecting, subsequent to causing the audio volume of the output of the first media asset on the first media consumption device to be lowered, that the audio volume of the output of the first media asset on the first media consumption device still exceeds a threshold value; and based on the detecting, selecting the second media consumption device based on an audio output capability of the second media consumption device.

11. A system comprising control circuitry configured to:

detect that a first media consumption device is outputting a media asset;

detect a presence of a first user and a second user in a vicinity of the first media consumption device;

determine, based on a sensor input, that the first user is asleep; and based at least in part on (a) the determining that the first user is asleep and (b) the detecting the presence of the first user and the second user in the vicinity of the first media consumption device:
cause the output of the media asset to be transitioned to a second media consumption device.

12. The system of claim 11, wherein the media asset comprises and audio component and a video component, and wherein the control circuitry is further configured, when causing the output of the media asset to be transitioned to a second media consumption device to:

cause the output of the audio component to be transitioned to the second media consumption device; and cause the output of the video component to continue to be output by the first media consumption device.

13. The system of claim 11, wherein the control circuitry is further configured to:

detect that the first media consumption device comprises a first output capability; and select the second media consumption device, from a plurality of media consumption devices, based on determining that the second media consumption device comprises a second output capability, different from the first output capability.

14. The system of claim 13, wherein the first output capability corresponds to an audio output capability of the first media consumption device and the second output capability corresponds to a second audio output capability of the second media consumption device.

15. The system of claim 13, wherein the control circuitry is further configured to:

determine the first output capability based on a first device type of the first media consumption device; and determine the second output capability based on a second device type of the first media consumption device.

16. The system of claim 11, wherein the first user is located in a first room and the second user is located in a second room.

17. The system of claim 11, wherein the control circuitry is further configured, when detecting the presence of the first user and the second user in the vicinity of the first media consumption device, to:

detect a first portable device that is associated with the first user; and detect a second portable device that is associated with the second user.

18. The system of claim 11, wherein the sensor input is a movement sensor input, and wherein the control circuitry is further configured, when determining that the first user is asleep, to detect, based on the movement sensor input, that the first user has not moved within a threshold period of time.

19. The system of claim 11, wherein the control circuitry is further configured, when determining that the first user is asleep, to determine that a light corresponding to a room of the first user is off.

20. The system of claim 11, wherein the control circuitry is further configured, based at least in part on the determining that the first user is asleep, to:

determine that an audio volume of the output of the first media asset on the first media consumption device exceeds a threshold value;

cause the audio volume of the output of the first media asset on the first media consumption device to be lowered; and detect, subsequent to causing the audio volume of the output of the first media asset on the first media consumption device to be lowered, that the audio volume of the output of the first media asset on the first media consumption device still exceeds a threshold value; and based on the detecting, select the second media consumption device based on an audio output capability of the second media consumption device.

* * * * *